United States Patent
Wang et al.

(10) Patent No.: US 12,388,598 B2
(45) Date of Patent: Aug. 12, 2025

(54) SUPPORT OF FLEXIBLE SOUNDING REFERENCE SIGNAL SWITCHING CAPABILITY

(71) Applicant: QUALCOMM INCORPORATED, San Diego, CA (US)

(72) Inventors: Runxin Wang, San Diego, CA (US); Muhammad Sayed Khairy Abdelghaffar, San Jose, CA (US); Peter Gaal, San Diego, CA (US); Alexandros Manolakos, Escondido, CA (US); Seyed Ali Akbar Fakoorian, San Diego, CA (US); Yu Zhang, San Diego, CA (US); Hwan Joon Kwon, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 219 days.

(21) Appl. No.: 17/997,292

(22) PCT Filed: Jun. 18, 2021

(86) PCT No.: PCT/CN2021/100858
§ 371 (c)(1),
(2) Date: Oct. 27, 2022

(87) PCT Pub. No.: WO2021/259159
PCT Pub. Date: Dec. 30, 2021

(65) Prior Publication Data
US 2023/0171067 A1  Jun. 1, 2023

(30) Foreign Application Priority Data
Jun. 22, 2020  (WO) ............... PCT/CN2020/097361

(51) Int. Cl.
*H04L 5/00* (2006.01)

(52) U.S. Cl.
CPC .......... *H04L 5/0051* (2013.01); *H04L 5/0096* (2013.01)

(58) Field of Classification Search
CPC ....................................................... H04L 5/00
See application file for complete search history.

(56) References Cited

U.S. PATENT DOCUMENTS 10,568,041 B2  2/2020  Molavianjazi et al.
2013/0329660 A1*  12/2013  Noh ................. H04L 5/0053
                                                      370/329
(Continued)

FOREIGN PATENT DOCUMENTS

CN   110830209 A      2/2020
EP   3806373 A1 *    4/2021   .......... H04B 7/0617
(Continued)

OTHER PUBLICATIONS

Fujitsu: "Signalling for PUCCH/PUSCH Configuration in eIMTA," 3GPP TSG RAN WG1 Meeting #76, R1-140187, Prague, Czech Republic, Feb. 10-14, 2014, (Feb. 14, 2014) 6 pages, the whole document.

(Continued)

*Primary Examiner* — Shukri Taha
(74) *Attorney, Agent, or Firm* — Holland & Hart / QUALCOMM Incorporated

(57) ABSTRACT

Methods, systems, and devices for wireless communications are described. A user equipment (UE) may receive a configuration signal indicating one or more reference signal resource sets, the one or more reference signal resource sets comprising at least a first subset of reference signal resources associated with a first reference signal switching configuration and a second subset of reference signal resources associated with a second reference signal switching configuration. The UE may receive a trigger signal activating at least the first reference signal switching con- (Continued)

figuration or the second reference signal switching configuration. The UE may transmit, based at least in part on the trigger signal, reference signals according to the first subset of reference signal resources or second subset of reference signal resources.

30 Claims, 18 Drawing Sheets

(56) References Cited

U.S. PATENT DOCUMENTS

| | | |
|---|---|---|
| 2016/0112173 A1 | 4/2016 | Wang et al. |
| 2019/0174466 A1 | 6/2019 | Zhang et al. |
| 2019/0190669 A1 | 6/2019 | Park et al. |
| 2019/0356431 A1 | 11/2019 | Manolakos et al. |
| 2020/0052853 A1 | 2/2020 | Qin et al. |

FOREIGN PATENT DOCUMENTS

| | | | |
|---|---|---|---|
| WO | 2020056180 A1 | 3/2020 | |
| WO | WO-2021088264 A1 * | 5/2021 | ............... H04B 7/02 |

OTHER PUBLICATIONS

International Search Report and Written Opinion—PCT/CN2020/097361—ISA/EPO—Mar. 22, 2021.

International Search Report and Written Opinion—PCT/CN2021/100858—ISA/EPO—Sep. 18, 2021.

Mediatek Inc: "Motivation to introduce new R17 WI on further RRN enhancement", 3GPP TSG-RAN WG4 Meeting #95-e, R4-2006480, 3rd Generation Partnership Project, Mobile Competence Centre, 650, Route Des Lucioles, F-06921, Sophia-Antipolis Cedex, France, vol. RAN WG4, No. Electronic Meeting, May 25, 2020-Jun. 5, 2020 May 15, 2020, XP051883561, 7 Pages, p. 7.

Nokia., et al., "On remaining open issues for per-BWP DL MIMO layers", 3GPP TSG RAN WG1 meeting #1 Ole, R1-2004579, 3rd Generation Partnership Project, Mobile Competence Centre, 650, Route Des Lucioles, F-06921, Sophia-Antipolis Cedex, France, vol. RAN WG1, No. e-Meeting, May 25, 2020-Jun. 5, 2020, May 15, 2020, XP052345950, 2 Pages, p. 1-p. 2.

Supplementary European Search Report—EP21827964—Search Authority—The Hague—Jun. 18, 2024.

Mediatek Inc: "Motivation to Introduce New R17 WI on Further RRM Enhancement", 3GPP TSG-RAN WG4 Meeting #95-e, R4-2006480, Electronic Meeting, May 25, 2020-Jun. 5, 2020, May 15, 2020, 7 Pages, Section 2.2, and p. 7.

Ericsson: "Configuration of SRS Carrier Switching", 3GPP TSG-RAN WG2 #110e, Tdoc R2-2005072, Electronic meeting, Jun. 1-12, 2020, pp. 1-22.

OPPO: "Enable gNB to configure downgrading configuration of SRS for antenna switching", 3GPP TSG RAN WG1 #99, R1-1911853, Reno, USA, Nov. 18-22, 2019, 9 pages.

* cited by examiner

SUPPORT OF FLEXIBLE SOUNDING REFERENCE SIGNAL SWITCHING CAPABILITY

CROSS REFERENCES

The present Application is a 371 national stage filing of International PCT Application No. PCT/CN2021/100858 by WANG et al. entitled "SUPPORT OF FLEXIBLE SOUNDING REFERENCE SIGNAL SWITCHING CAPABILITY," filed Jun. 18, 2021; and claims priority to International Patent Application No. PCT/CN2020/097361 by WANG et al. entitled "SUPPORT OF FLEXIBLE SOUNDING REFERENCE SIGNAL SWITCHING CAPABILITY," filed Jun. 22, 2020, each of which is assigned to the assignee hereof, and each of which is expressly incorporated by reference in its entirety herein.

FIELD OF TECHNOLOGY

The following relates generally to wireless communications and more specifically to support of flexible sounding reference signal switching capability.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that supports flexible sounding reference signal (SRS) switching capability. Generally, the described techniques provide various mechanisms that support wireless communications in a wireless network. Broadly, aspects of the described techniques support various mechanisms that allow a more flexible approach to support dynamic configuration for reference signal switching (e.g., for SRS antenna switching). Broadly, a user equipment (UE) may support different SRS switching capabilities, e.g., based on the number of available antennas, antenna configurations, transmit chains, receive chains, etc., of the UE. A base station may typically configure a single, fixed SRS switching capability for a bandwidth part (BWP) of the UE, which may be less than optimal for channel performance estimation. However, aspects of the described techniques may include the base station configuring the UE with SRS resource set(s) that include a first subset of SRS resource(s) associated with a first SRS switching configuration and a second subset of SRS resource(s) associated with a second SRS switching configuration.

In one example, this may include multiple SRS resource sets, with some SRS resource set(s) being associated with the first SRS switching configuration and other SRS resource set(s) being associated with the second SRS switching configuration. In another example, this may include the UE being configured with one SRS resource set, with a first subset of SRS resources of the SRS resource set being associated with the first SRS switching configuration and a second subset of SRS resources of the SRS resource set being associated with the second SRS switching configuration. The base station may send a trigger signal to the UE activating one or more of the SRS switching configurations. In some aspects, the trigger signal may indicate a group identifier associated with the activated SRS switching configuration(s), different periodicities (e.g., timing configurations) for the SRS switching configuration(s), and the like. The UE may then perform SRS transmissions according to the SRS resource set(s)/SRS resource(s) associated with the activated SRS switching configuration(s).

A method of wireless communication at a UE is described. The method may include receiving a configuration signal indicating one or more reference signal resource sets, the one or more reference signal resource sets including at least a first subset of reference signal resources associated with a first reference signal switching configuration and a second subset of reference signal resources associated with a second reference signal switching configuration, receiving a trigger signal activating at least the first reference signal switching configuration or the second reference signal switching configuration, and transmitting, based on the trigger signal, reference signals according to the first subset of reference signal resources or second subset of reference signal resources.

An apparatus for wireless communication at a UE is described. The apparatus may include a processor, memory coupled with the processor, and instructions stored in the memory. The instructions may be executable by the processor to cause the apparatus to receive a configuration signal indicating one or more reference signal resource sets, the one or more reference signal resource sets including at least a first subset of reference signal resources associated with a first reference signal switching configuration and a second subset of reference signal resources associated with a second reference signal switching configuration, receive a trigger signal activating at least the first reference signal switching configuration or the second reference signal switching configuration, and transmit, based on the trigger signal, reference signals according to the first subset of reference signal resources or second subset of reference signal resources.

Another apparatus for wireless communication at a UE is described. The apparatus may include means for receiving a configuration signal indicating one or more reference signal resource sets, the one or more reference signal resource sets including at least a first subset of reference signal resources associated with a first reference signal switching configuration and a second subset of reference signal resources associated with a second reference signal switching configuration, receiving a trigger signal activating at least the first reference signal switching configuration or the second reference signal switching configuration, and transmitting, based on the trigger signal, reference signals according to the first subset of reference signal resources or second subset of reference signal resources.

A non-transitory computer-readable medium storing code for wireless communication at a UE is described. The code may include instructions executable by a processor to receive a configuration signal indicating one or more reference signal resource sets, the one or more reference signal resource sets including at least a first subset of reference signal resources associated with a first reference signal switching configuration and a second subset of reference signal resources associated with a second reference signal switching configuration, receive a trigger signal activating at least the first reference signal switching configuration or the second reference signal switching configuration, and transmit, based on the trigger signal, reference signals according to the first subset of reference signal resources or second subset of reference signal resources.

In some examples of the method, apparatuses, and non-transitory computer-readable medium described herein, receiving the configuration signal may include operations, features, means, or instructions for receiving the configuration signal that indicates a set of reference signal resource sets, the set of reference signal resource sets including at least a first reference signal resource set including the first subset of reference signal resources associated with the first reference signal switching configuration and a second reference signal resource set including the second subset of reference signal resources associated with the second reference signal switching configuration.

In some examples of the method, apparatuses, and non-transitory computer-readable medium described herein, receiving the configuration signal may include operations, features, means, or instructions for receiving the configuration signal that indicates a first group identifier associated with the first reference signal resource set and a second group identifier associated with the second reference signal resource set.

In some examples of the method, apparatuses, and non-transitory computer-readable medium described herein, receiving the configuration signal may include operations, features, means, or instructions for receiving the configuration signal that indicates a first periodicity for the first reference signal resource set and a second periodicity for the second reference signal resource set.

In some examples of the method, apparatuses, and non-transitory computer-readable medium described herein, receiving the trigger signal may include operations, features, means, or instructions for receiving the trigger signal that activates the first reference signal switching configuration according to the first periodicity for the first reference signal resource set and the second reference signal switching configuration according to the second periodicity for the second reference signal resource set.

In some examples of the method, apparatuses, and non-transitory computer-readable medium described herein, receiving the trigger signal may include operations, features, means, or instructions for receiving the trigger signal that activates the first reference signal switching configuration according to the first periodicity for the first reference signal resource set and, upon expiration of the first periodicity, activates the second reference signal switching configuration according to the second periodicity for the second reference signal resource set.

In some examples of the method, apparatuses, and non-transitory computer-readable medium described herein, receiving the configuration signal may include operations, features, means, or instructions for receiving the configuration signal that indicates a single reference signal resource set, the single reference signal resource set including at least the first subset of reference signal resources associated with the first reference signal switching configuration and the second subset of reference signal resources associated with the second reference signal switching configuration.

In some examples of the method, apparatuses, and non-transitory computer-readable medium described herein, receiving the configuration signal may include operations, features, means, or instructions for receiving the configuration signal that indicates a first group identifier associated with the first subset of reference signal resources and a second group identifier associated with the second subset of reference signal resources, where the trigger signal activates the first subset of reference signal resources or the second subset of reference signal resources.

In some examples of the method, apparatuses, and non-transitory computer-readable medium described herein, receiving the configuration signal may include operations, features, means, or instructions for receiving the configuration signal that indicates a first periodicity for the first subset of reference signal resources and a second periodicity for the second subset of reference signal resources.

In some examples of the method, apparatuses, and non-transitory computer-readable medium described herein, receiving the trigger signal may include operations, features, means, or instructions for receiving the trigger signal that activates the first reference signal switching configuration according to the first periodicity for the first subset of reference signal resources and the second reference signal switching configuration according to the second periodicity for the second subset of reference signal resources.

In some examples of the method, apparatuses, and non-transitory computer-readable medium described herein, receiving the trigger signal may include operations, features, means, or instructions for receiving the trigger signal that activates the first reference signal switching configuration according to the first periodicity for the first reference signal resource set and, upon expiration of the first periodicity, activates the second reference signal switching configuration according to the second periodicity for the second reference signal resource set.

In some examples of the method, apparatuses, and non-transitory computer-readable medium described herein, receiving the configuration signal may include operations, features, means, or instructions for receiving the configuration signal that indicates a first slot-level periodicity associated with the first subset of reference signal resources and a second slot-level periodicity associated with the second subset of reference signal resources that differs from the first slot-level periodicity.

In some examples of the method, apparatuses, and non-transitory computer-readable medium described herein, receiving the trigger signal may include operations, features, means, or instructions for receiving the trigger signal that includes a group identifier that indicates one of the first reference signal switching configuration or the second reference signal switching configuration, where the reference signals may be transmitted in accordance with the first reference signal switching configuration or the second reference signal switching configuration corresponding to the group identifier.

In some examples of the method, apparatuses, and non-transitory computer-readable medium described herein, receiving the trigger signal may include operations, features, means, or instructions for receiving the trigger signal that includes a trigger state indication that indicates one of the first reference signal switching configuration or the second reference signal switching configuration, where the reference signals may be aperiodic reference signals that may be transmitted in accordance with the first reference signal switching configuration or the second reference signal switching configuration corresponding to the trigger state indication.

In some examples of the method, apparatuses, and non-transitory computer-readable medium described herein, the trigger signal includes a downlink control information (DCI) or a medium access control (MAC) control element (CE).

Some examples of the method, apparatuses, and non-transitory computer-readable medium described herein may further include operations, features, means, or instructions for transmitting a UE capability message indicating support for multiple reference signal switching configurations for a bandwidth part (BWP), where the configuration signal may be based on the UE capability message.

Some examples of the method, apparatuses, and non-transitory computer-readable medium described herein may further include operations, features, means, or instructions for transmitting a UE capability message indicating an antenna switching capability of the UE, where the configuration signal may be based on the antenna switching capability.

Some examples of the method, apparatuses, and non-transitory computer-readable medium described herein may further include operations, features, means, or instructions for transmitting a UE capability message indicating support for multiple active reference signal switching configurations for a BWP, the multiple active reference signal switching configurations comprising active reference signal switching configurations associated with different timing configurations, wherein the configuration signal is based at least in part on the UE capability message.

In some examples of the method, apparatuses, and non-transitory computer-readable medium described herein, transmitting the reference signals may include operations, features, means, or instructions for transmitting a first one or more reference signals using a first antenna configuration, and transmitting a second one or more reference signals using a second antenna configuration different from the first antenna configuration.

A method of wireless communication at a base station is described. The method may include transmitting, to a UE, a configuration signal indicating one or more reference signal resource sets, the one or more reference signal resource sets including at least a first subset of reference signal resources associated with a first reference signal switching configuration and a second subset of reference signal resources associated with a second reference signal switching configuration, transmitting a trigger signal activating at least the first reference signal switching configuration or the second reference signal switching configuration, and receiving, based on the trigger signal, reference signals according to the first subset of reference signal resources or second subset of reference signal resources.

An apparatus for wireless communication at a base station is described. The apparatus may include a processor, memory coupled with the processor, and instructions stored in the memory. The instructions may be executable by the processor to cause the apparatus to transmit, to a UE, a configuration signal indicating one or more reference signal resource sets, the one or more reference signal resource sets including at least a first subset of reference signal resources associated with a first reference signal switching configuration and a second subset of reference signal resources associated with a second reference signal switching configuration, transmit a trigger signal activating at least the first reference signal switching configuration or the second reference signal switching configuration, and receive, based on the trigger signal, reference signals according to the first subset of reference signal resources or second subset of reference signal resources.

Another apparatus for wireless communication at a base station is described. The apparatus may include means for transmitting, to a UE, a configuration signal indicating one or more reference signal resource sets, the one or more reference signal resource sets including at least a first subset of reference signal resources associated with a first reference signal switching configuration and a second subset of reference signal resources associated with a second reference signal switching configuration, transmitting a trigger signal activating at least the first reference signal switching configuration or the second reference signal switching configuration, and receiving, based on the trigger signal, reference signals according to the first subset of reference signal resources or second subset of reference signal resources.

A non-transitory computer-readable medium storing code for wireless communication at a base station is described. The code may include instructions executable by a processor to transmit, to a UE, a configuration signal indicating one or more reference signal resource sets, the one or more reference signal resource sets including at least a first subset of reference signal resources associated with a first reference signal switching configuration and a second subset of reference signal resources associated with a second reference signal switching configuration, transmit a trigger signal activating at least the first reference signal switching configuration or the second reference signal switching configuration, and receive, based on the trigger signal, reference signals according to the first subset of reference signal resources or second subset of reference signal resources.

In some examples of the method, apparatuses, and non-transitory computer-readable medium described herein, transmitting the configuration signal may include operations, features, means, or instructions for transmitting the configuration signal that indicates a set of reference signal resource sets, the set of reference signal resource sets including at least a first reference signal resource set including the first subset of reference signal resources associated with the first reference signal switching configuration and a second reference signal resource set including the second subset of reference signal resources associated with the second reference signal switching configuration.

In some examples of the method, apparatuses, and non-transitory computer-readable medium described herein, transmitting the configuration signal may include operations, features, means, or instructions for transmitting the configuration signal that indicates a first group identifier associated with the first reference signal resource set and a second group identifier associated with the second reference signal resource set.

In some examples of the method, apparatuses, and non-transitory computer-readable medium described herein, transmitting the configuration signal may include operations, features, means, or instructions for transmitting the configuration signal that indicates a first periodicity for the first reference signal resource set and a second periodicity for the second reference signal resource set.

In some examples of the method, apparatuses, and non-transitory computer-readable medium described herein, transmitting the trigger signal may include operations, features, means, or instructions for transmitting the trigger signal that activates the first reference signal switching configuration according to the first periodicity for the first reference signal resource set and the second reference signal switching configuration according to the second periodicity for the second reference signal resource set.

In some examples of the method, apparatuses, and non-transitory computer-readable medium described herein, transmitting the trigger signal may include operations, features, means, or instructions for transmitting the trigger signal that activates the first reference signal switching configuration according to the first periodicity for the first reference signal resource set and, upon expiration of the first periodicity, activates the second reference signal switching configuration according to the second periodicity for the second reference signal resource set.

In some examples of the method, apparatuses, and non-transitory computer-readable medium described herein, transmitting the configuration signal may include operations, features, means, or instructions for transmitting the configuration signal that indicates a single reference signal resource set, the single reference signal resource set including at least the first subset of reference signal resources associated with the first reference signal switching configuration and the second subset of reference signal resources associated with the second reference signal switching configuration.

In some examples of the method, apparatuses, and non-transitory computer-readable medium described herein, transmitting the configuration signal may include operations, features, means, or instructions for transmitting the configuration signal that indicates a first group identifier associated with the first subset of reference signal resources and a second group identifier associated with the second subset of reference signal resources, where the trigger signal activates the first subset of reference signal resources or the second subset of reference signal resources.

In some examples of the method, apparatuses, and non-transitory computer-readable medium described herein, transmitting the configuration signal may include operations, features, means, or instructions for transmitting the configuration signal that indicates a first periodicity for the first subset of reference signal resources and a second periodicity for the second subset of reference signal resources.

In some examples of the method, apparatuses, and non-transitory computer-readable medium described herein, transmitting the trigger signal may include operations, features, means, or instructions for transmitting the trigger signal that activates the first reference signal switching configuration according to the first periodicity for the first subset of reference signal resources and the second reference signal switching configuration according to the second periodicity for the second subset of reference signal resources.

In some examples of the method, apparatuses, and non-transitory computer-readable medium described herein, transmitting the trigger signal may include operations, features, means, or instructions for transmitting the trigger signal that activates the first reference signal switching configuration according to the first periodicity for the first reference signal resource set and, upon expiration of the first periodicity, activates the second reference signal switching configuration according to the second periodicity for the second reference signal resource set.

In some examples of the method, apparatuses, and non-transitory computer-readable medium described herein, transmitting the configuration signal may include operations, features, means, or instructions for transmitting the configuration signal that indicates a first slot-level periodicity associated with the first subset of reference signal resources and a second slot-level periodicity associated with the second subset of reference signal resources that differs from the first slot-level periodicity.

In some examples of the method, apparatuses, and non-transitory computer-readable medium described herein, transmitting the trigger signal may include operations, features, means, or instructions for transmitting the trigger signal that includes a group identifier that indicates one of the first reference signal switching configuration or the second reference signal switching configuration, where the reference signals may be transmitted in accordance with the first reference signal switching configuration or the second reference signal switching configuration corresponding to the group identifier.

In some examples of the method, apparatuses, and non-transitory computer-readable medium described herein, transmitting the trigger signal may include operations, features, means, or instructions for transmitting the trigger signal that includes a trigger state indication that indicates one of the first reference signal switching configuration or the second reference signal switching configuration, where the reference signals may be aperiodic reference signals that may be transmitted in accordance with the first reference signal switching configuration or the second reference signal switching configuration corresponding to the trigger state indication.

In some examples of the method, apparatuses, and non-transitory computer-readable medium described herein, the trigger signal includes a DCI or a MAC CE.

Some examples of the method, apparatuses, and non-transitory computer-readable medium described herein may further include operations, features, means, or instructions for receiving a UE capability message indicating support for multiple reference signal switching configurations for a BWP, where the configuration signal may be transmitted based on the UE capability message.

Some examples of the method, apparatuses, and non-transitory computer-readable medium described herein may further include operations, features, means, or instructions for receiving a UE capability message indicating an antenna switching capability of the UE, where the configuration signal may be transmitted based on the antenna switching capability.

Some examples of the method, apparatuses, and non-transitory computer-readable medium described herein may further include operations, features, means, or instructions for receiving a UE capability message indicating support for multiple active reference signal switching configurations for a BWP, the multiple active reference signal switching configurations comprising active reference signal switching configurations associated with different timing configurations, wherein the configuration signal is based at least in part on the UE capability message.

In some examples of the method, apparatuses, and non-transitory computer-readable medium described herein, receiving the reference signals may include operations, features, means, or instructions for receiving a first one or more reference signals using a first antenna configuration, and receiving a second one or more reference signals using a second antenna configuration different from the first antenna configuration.

DETAILED DESCRIPTION

Figure 1:
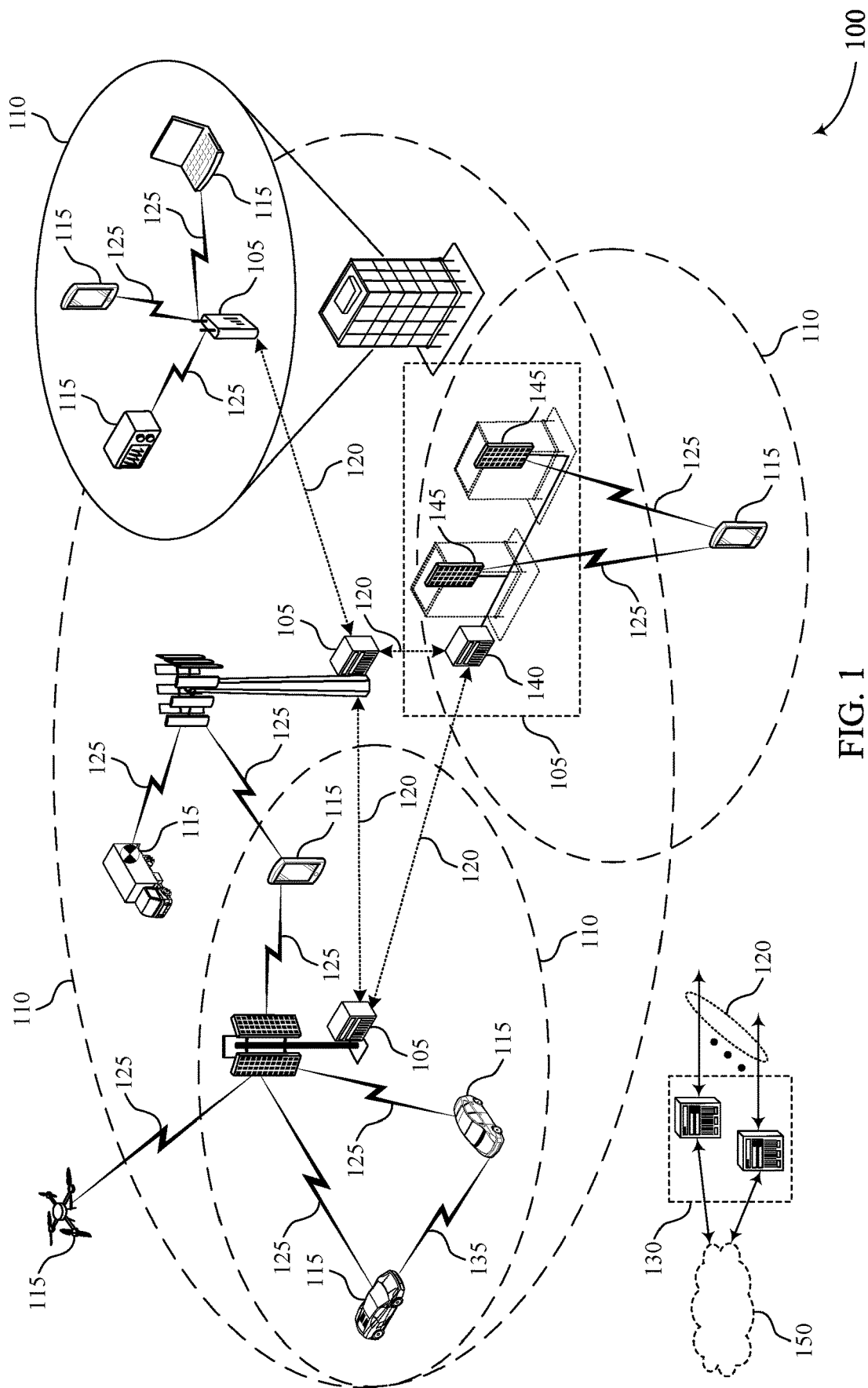
FIG. 1 illustrates an example of a system for wireless communications in accordance with aspects of the present disclosure.

Some wireless communication systems may support reference signal switching, such as sounding reference signal (SRS) switching, to enhance channel performance estimation. For example, a user equipment (UE) may perform SRS transmissions according to an SRS switching configuration. The base station may measure the channel performance based on the SRS transmissions to identify or otherwise determine how the channel is performing to ensure continued communications with the UE. The UE may be configured or otherwise support, and report to the base station, different SRS switching capabilities, e.g., based on the capability of the UE. For example, the UE may transmit a UE capability message to its serving base station that identifies the supported SRS switching capabilities of the UE, e.g., either an explicit indication or implicitly, such as by reporting the number of antennas, receive chains, transmit chains, etc., of the UE. However, a base station may typically configure a single, fixed SRS switching capability for a bandwidth part (BWP) of the UE. Limiting a BWP used for communications with the UE to a single SRS switching configuration may not accurately correspond to the current and/or constantly changing conditions for the channel between the UE and base station.

Aspects of the disclosure are initially described in the context of wireless communications systems. Broadly, aspects of the described techniques support various mechanisms that allow a more flexible approach to support dynamic configuration for reference signal switching (e.g., for SRS antenna switching, although the described techniques are not limited to SRS switching but may be used for any reference signal type). Broadly, the UE may support different SRS switching capabilities, e.g., based on the number of antennas, antenna configurations, transmit chains, receive chains, etc., of the UE. In some aspects, the base station may configure the UE with SRS resource set(s) that include a first subset of SRS resource(s) associated with a first SRS switching configuration and a second subset of SRS resource(s) associated with a second SRS switching configuration.

In one example, this may include multiple SRS resource sets, with some SRS resource set(s) being associated with the first SRS switching configuration and other SRS resource set(s) being associated with the second SRS switching configuration. In another example, this may include one SRS resource set being configured for the UE, with a first subset of SRS resources of the SRS resource set being associated with the first SRS switching configuration and a second subset of SRS resources of the SRS resource set being associated with the second SRS switching configuration. The base station may send a trigger signal to the UE activating one or more of the SRS switching configurations, e.g., the trigger signal may indicate a group identifier associated with the activated/triggered SRS switching configuration(s). The UE may then perform SRS transmission according to the SRS resources associated with the activated SRS switching configuration(s).

Aspects of the disclosure are further illustrated by and described with reference to apparatus diagrams, system diagrams, and flowcharts that relate to support of flexible SRS switching capability.

FIG. 1 illustrates an example of a wireless communications system 100 that supports flexible SRS switching capability in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive a configuration signal indicating one or more reference signal resource sets (e.g., SRS resource set(s)), the one or more reference signal resource sets comprising at least a first subset of reference signal resources (e.g., SRS resource(s)) associated with a first reference signal switching configuration and a second subset of reference signal resources associated with a second reference signal switching configuration. The UE 115 may receive a trigger signal activating at least the first reference signal switching configuration or the second reference signal switching configuration. The UE 115 may transmit, based at least in part on the trigger signal, reference signals according to the first subset of reference signal resources or second subset of reference signal resources.

A base station 105 may transmit, to a UE 115, a configuration signal indicating one or more reference signal resource sets, the one or more reference signal resource sets comprising at least a first subset of reference signal resources associated with a first reference signal switching configuration and a second subset of reference signal resources associated with a second reference signal switching configuration. The base station 105 may transmit a trigger signal activating at least the first reference signal switching configuration or the second reference signal switching configuration. The base station 105 may receive, based at least in part on the trigger signal, reference signals according to the first subset of reference signal resources or second subset of reference signal resources.

Figure 2A:
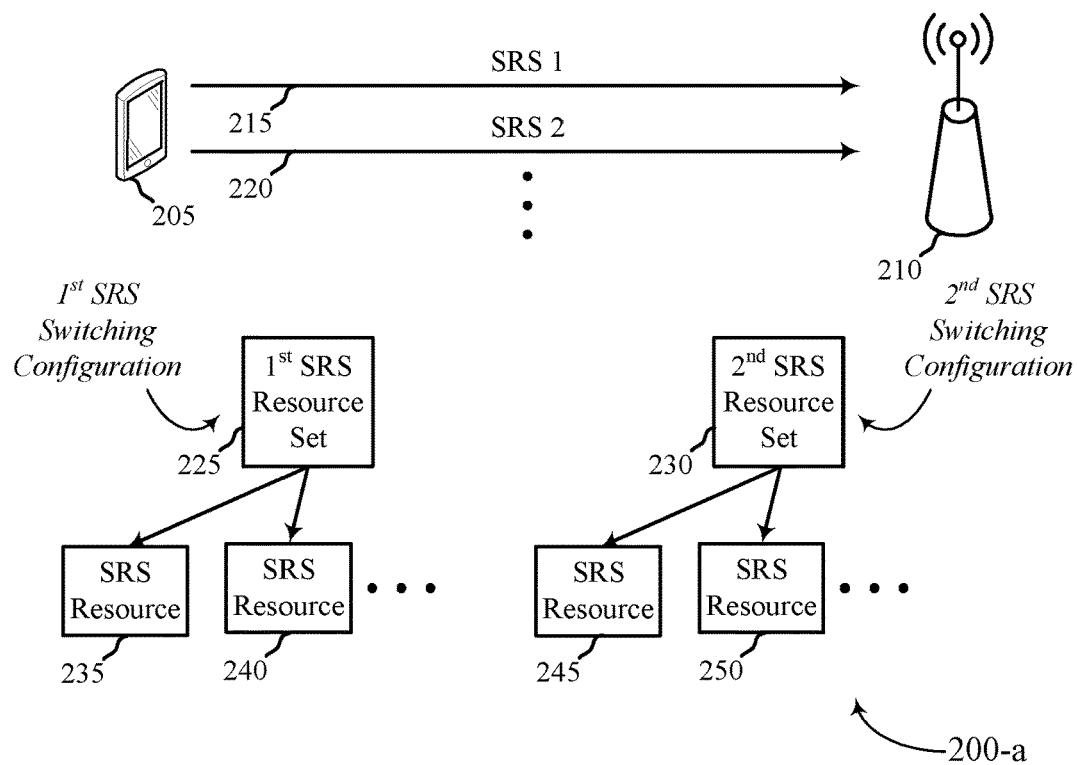
FIGS. 2A and 2B illustrate examples of a wireless communication system in accordance with aspects of the present disclosure.
Figure 2B:
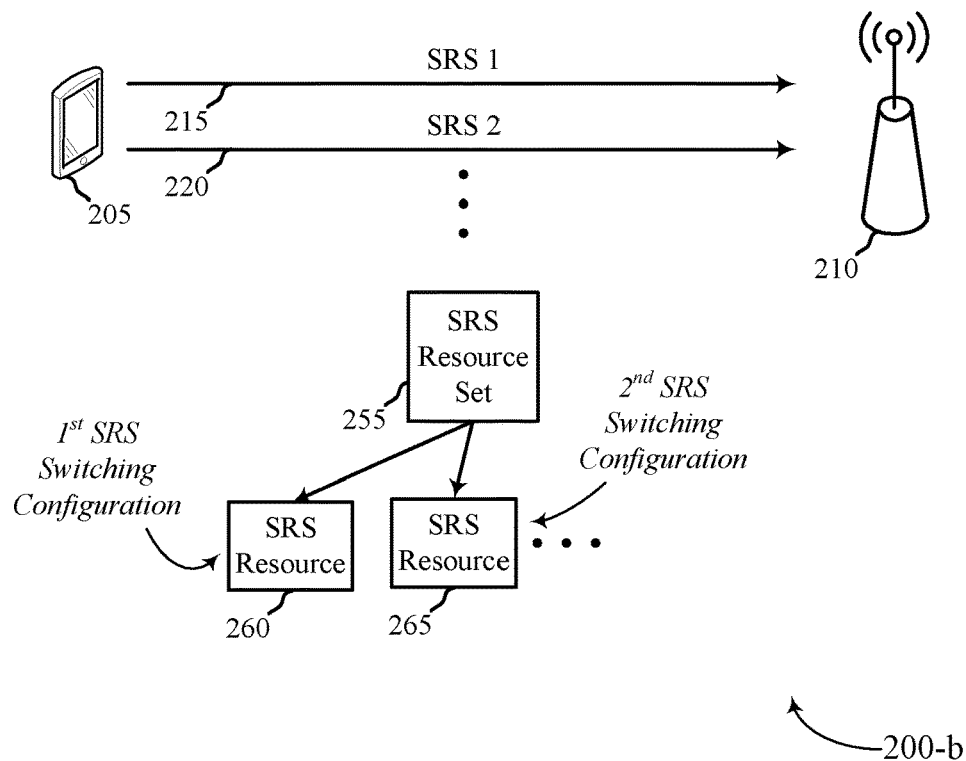

FIGS. 2A and 2B illustrate examples of a wireless communication system 200 that supports flexible SRS switching capability in accordance with aspects of the present disclosure. In some examples, wireless communication system 200 may implement aspects of wireless communication system 100. Wireless communication system 200 may include UE 205 and/or base station 210, which may be examples of the corresponding devices described herein. Wireless communication system 200-*a* of FIG. 2A illustrates an example where UE 205 is configured with a plurality of reference signal resource sets (e.g., SRS resource sets), with at least one reference signal resource set associated with a first reference signal switching configuration and another reference signal resource set associated with a second reference signal switching configuration. Wireless communication system 200-*b* of FIG. 2B illustrates an example where UE 205 is configured with a single reference signal resource set (e.g., one SRS resource set), with at least one reference signal resource (e.g., one SRS resource) of the reference signal resource set associated with the first reference signal switching configuration and another reference signal resource of the reference signal resource set associated with the second reference signal switching configuration.

Broadly, an SRS resource set (e.g., a reference signal resource set) may include a set of SRS resources transmitted by UE 205. The SRS resource set may be transmitted aperiodically, semi-persistently, and/or periodically (e.g., according to different timing configurations). Accordingly, UE 205 may be configured with multiple SRS resources, which may be grouped into the SRS resource set, depending on the use case (e.g., antenna switching, codebook-based, non-codebook based, beam management, and the like). In some aspects, UE 205 may perform SRS transmissions on the corresponding SRS resources in the last few symbols of the slot (e.g., in the last six symbols of a slot).

In some aspects, UE 205 may be configured with, or otherwise support, different SRS switching capabilities. For example, UE 205 may be configured with, or otherwise have available, a single transmit chain (1T) or with multiple transmit chains (e.g., 2T, 3T, 4T, etc.). Similarly, UE 205 may be configured with a single receive chain (1R) or with multiple receive chains (e.g., 2R, 3R, 4R, etc.). UE 205 may also be configured with one or more antennas available for the transmit and/or receive chain(s). Moreover, UE 205 may also support multiple antenna configurations using the antenna(s), transmit chain(s), and/or receive chain(s). For example, UE 205 may support directional transmissions and/or receptions using various antenna configurations and the corresponding transmit and/or receive chain(s)/ antenna(s).

In some aspects, this may support or otherwise enable UE 205 to support different SRS switching configurations (e.g., reference signal switching configurations, such as SRS antenna switching configurations). For example, UE 205 may transmit or otherwise convey an indication of a UE capability message to base station 210 indicating supported SRS switching capabilities (e.g., the antenna switching capability of UE 205). In one non-limiting example, this may include UE 205 transmitting or otherwise conveying an indication of a supported SRS transmit port switching (e.g., supportedSRS-TxPortSwitch) metric, such as 1T2R, 2T4R, 1T4R, T=R, etc. Based on the UE capability, base station 210 may transmit or otherwise convey a configuration signal (e.g., using RRC signaling) to UE 205 configuring one or more SRS resource sets (e.g., one or more reference signal resource sets). In some examples, this may include up to two SRS resource sets being configured, with each SRS resource set having two or more SRS resources transmitted in different symbols. Each SRS resource in an SRS resource set may include, or otherwise be associated with, a single SRS port, with the SRS port of the second resource in the set being associated with a different UE antenna port than the SRS port of the first SRS resource in the set.

SRS switching may enhance channel performance estimation. For example, UE 205 may perform SRS transmissions according to the SRS switching configuration. Base station 210 may measure the channel performance based on the SRS transmissions to identify or otherwise determine how the channel is performing to ensure continued communications with UE 205. In some aspects, base station 210 may configure UE 205 with one SRS switching configuration for a BWP. However, this approach may be less than optimal as the single SRS switching configuration may not enable a comprehensive determination of the channel performance at any given moment. That is, a single SRS switching configuration may limit the number and/or how the SRS are transmitted across the channel, which may limit how base station 210 is able to measure the channel.

Accordingly, aspects of the described techniques provide a more flexible mechanism for dynamic SRS switching configurations. Broadly, aspects of the described techniques may support RRC configuration for SRS resources. This may include introducing multiple groups of SRS resource sets being configured, with some SRS resource sets being associated with different SRS switching capabilities (e.g., for different SRS antenna switching configurations). This may include introducing multiple groups of SRS resources within one SRS resource set being configured, with some SRS resources in the set being associated with different SRS switching capabilities (e.g., for different SRS antenna switching configurations). In some aspects, this may include indication signaling such as RRC-based periodical switching, MAC-CE and/or DCI-based switching indications (e.g., based on a group indication, a trigger state indication, and the like), such as a triggering signal activation. In some aspects, this may include different SRS resource-based periodicity configurations, UE capabilities, and the like.

Broadly, aspects of the described techniques may support base station 210 transmitting or otherwise conveying a configuration signal to UE 205 indicating one or more reference signal resource sets (e.g., SRS resource set(s)). In some aspects, the one or more reference signal resource sets may include a first subset of reference signal resources (e.g., SRS resources) associated with a first reference signal switching configuration (e.g., SRS resources for a first SRS antenna switching configuration) and a second subset of reference signal resources associated with a second reference signal switching configuration. Base station 210 may transmit or otherwise convey a trigger signal to UE 205 (e.g., using DCI and/or MAC CE based signaling) that activates the first reference signal switching configuration and/or the second reference signal switching configuration. UE 205 may, based on the trigger signal, transmit reference signals (e.g., SRS 215, SRS 220, etc.) according to the first subset of reference signal resources (e.g., SRS resources) and/or the second subset of reference signal resources. As discussed above, in some aspects this may include the configuration signal indicating a plurality of reference signal resource sets, with different reference signal resource sets associated with the corresponding different reference signal switching configurations and/or the configuration signal may indicate a single reference signal resource set, with different reference signal resources of the set associated with the corresponding different reference signal switching configurations.

For example and with reference to wireless communication system 200-*a* of FIG. 2A, base station 210 may transmit or otherwise convey the configuration signal to UE 205 (e.g., via RRC signaling) that indicates a plurality of reference signal resource sets (e.g., such as a first SRS resource set 225 and a second SRS resource set 230). In some aspects, the plurality of reference signal resource sets may include at least a first reference signal resource set associated with the first reference signal switching configuration and a second reference signal resource set associated with the second reference signal switching configuration. For example, the first SRS resource set 225 may include the first subset of reference signal resources (e.g., SRS resource 235, SRS resource 240, and the like) that are associated with the first reference signal switching configuration (e.g., the first SRS antenna switching configuration). The second SRS resource 230 may include the second subset of reference signal resources (e.g., SRS resource 245, SRS resource 250, and the like) that are associated with the second reference signal switching configuration (e.g., the second SRS antenna switching configuration). In some aspects, this may include the configuration signal indicating a first group identifier (e.g., groupID) associated with the first reference signal resource set and a second group identifier associated with the second reference signal resource set.

Accordingly, wireless communication system 200-*a* of FIG. 2A introduces multiple groups of SRS resource sets for different SRS switching capabilities (e.g., for different SRS antenna switching configurations). This may allow more SRS resource sets being configured with a usage indicator supporting antenna switching (e.g., antennaswitching). In some aspects, this may include introducing new RRC parameters in the SRS resource set (e.g., SRS-ResourceSet) portion of the RRC signaling that indicates or otherwise conveys the group identifier of the SRS resource set. In some aspects, base station 210 may indicate to UE 205 which group will be used for antenna switching. The SRS resource sets and different groups may be configured with different SRS capabilities (e.g., with different SRS antenna switching configurations). As one example, for periodic and/or semi-persistent (e.g., timing configurations) SRS resource sets in different SRS antenna switching configuration groups, the corresponding SRS resources may be configured with different periodicities. As another example, for aperiodic SRS resource sets in different SRS antenna switching configuration groups, these may be triggered with different triggering slot offsets (e.g., using the configuration signal). Accordingly, the configuration signal may indicate a first periodicity for the first reference signal resource set and the second periodicity for the second reference signal resource set. That is, different timing configurations (e.g., a persistent timing configuration, a semi-persistent timing configuration, and/or an aperiodic timing configuration) may be associated with the activated SRS resource sets.

Accordingly, aspects of the described techniques may introduce multiple groups of SRS resource sets for different SRS switching capabilities. This may include introducing or modifying RRC parameter(s), such as introducing a new switchingGroupID RRC parameter. Based on the switching group identifier, various other parameters may be different for the RRC configuration, including the slot offset parameter. In one non-limiting example, this may include the following RRC parameter:

configurations). In some examples, this may include activating both the first and second reference signal switching configurations, but with the trigger signal activating the first reference signal switching configuration according to the first periodicity and, upon expiration of the first periodicity, activating the second reference signal switching configuration according to the second periodicity. That is, the first reference signal switching configuration associated with the first periodicity may be activated for x time and, upon expiration of x time, the second reference signal switching configuration associated with the second periodicity may be automatically activated.

In some aspects, base station 210 may configure UE 205 with the plurality of reference signal resource sets based on the capability of UE 205. As discussed above, UE 205 may transmit or otherwise convey a UE capability message to base station 210 identifying the SRS antenna switching capabilities of UE 205. In some aspects, the UE capability message may indicate support for multiple active reference signal switching configurations for a BWP. The multiple

```
SRS-ResourceSet ::=            SEQUENCE {
    srs-ResourceSetId              SRS-ResourceSetId,
    srs-ResourceIdList             SEQUENCE (SIZE(1..maxNrofSRS-ResourcesPerSet))
OF SRS-ResourceId   OPTIONAL, -- Cond Setup
    resourceType                   CHOICE {
        aperiodic                      SEQUENCE {
            aperiodicSRS-ResourceTrigger          INTEGER (1..maxNrofSRS-TriggerStates-1),
            csi-RS                         NZP-CSI-RS-ResourceId                    OPTIONAL,
-- Cond NonCodebook
            slotOffset                     INTEGER (1..32)                          OPTIONAL, --
Need S
            ...,
            [[
            aperiodicSRS-ResourceTriggerList-v1530         SEQUENCE (SIZE(1..maxNrofSRS-
TriggerStates-2))
                                          OF INTEGER (1..maxNrofSRS-TriggerStates-1)
OPTIONAL -- Need M
            ]]
        },
        semi-persistent                SEQUENCE {
            associatedCSI-RS               NZP-CSI-RS-ResourceId
OPTIONAL, -- Cond NonCodebook
            ...
        },
        periodic                       SEQUENCE {
            associatedCSI-RS               NZP-CSI-RS-ResourceId
OPTIONAL, -- Cond NonCodebook
            ...
        }
    },
    usage                          ENUMERATED {beamManagement, codebook,
nonCodebook, antennaSwitching},
    alpha                                                                OPTIONAL, -- Need S
    p0                             INTEGER (-202..24)                               OPTIONAL, --
Cond Setup
    pathlossReferenceRS            CHOICE {
        ssb-Index                  ,
        csi-RS-Index                   NZP-CSI-RS-ResourceId
    }                                                                    OPTIONAL, -- Need M
    srs-PowerControlAdjustmentStates           ENUMERATED { sameAsFci2,
separateClosedLoop}        OPTIONAL, -- Need S
    switchingGroupID
    ...
```

In some aspects, the trigger signal may activate the first reference signal switching configuration according to the first periodicity for the first reference signal resource set and the second reference signal switching configuration according to the second periodicity for the second reference signal resource set. In some example, this may include activating both the first and second reference signal switching configurations, with each switching configuration being configured with a different periodicity (e.g., with different timing active reference signal switching configurations may include active reference signal switching configurations associated with different timing configurations. For example, some activated reference signal switching configurations may be associated with a persistent timing configuration, others may be associated with a semi-persistent timing configuration, while others are associated with an aperiodic timing configuration. For example, UE 205 may report its capability to support N 'active' different SRS resource sets of 'antenna switching' with different Time Domain behavior (e.g., aperiodic, semi-periodic, periodic) per BWP. In an example, UE 205 may report a value for N, where N=N1+N2+N3 that is respectively mapped to aperiodic, semi-periodic, and periodic time domain behaviors, to indicate how many different active SRS resource sets UE 205 is capable of supporting per BWP for each of the different time domain behaviors. One non-limiting example of the UE capability reported to base station 210 in the context of wireless communication system 200-*a* is illustrated in Table 1 below.

TABLE 1

| UE Capability | #SRS-Resource Set(s) for Antenna Switching |
|---|---|
| 1T2R | 0/1/2 |
| 2T4R | 0/1/2 |
| 1T4R | 0/1 for Semi-Persistent or Periodic |
| 1T4R | 0/2 for Aperiodic |
| 1T = 1R | 0/1/2 |
| 2T = 2R | 0/1/2 |
| 4T = 4R | 0/1/2 |

With reference to wireless communication system 200-*b* of FIG. 2B, base station 210 may transmit or otherwise convey the configuration signal to UE 205 that indicates a single reference signal resource set (e.g., SRS resource set 255). The single reference signal resource set may include at least the first subset of reference signal resources associated with the first reference signal switching configuration (e.g., SRS resource 260) and a second subset of reference signal resources associated with the second reference signal switching configuration (e.g., SRS resource 265). For example, the configuration signal may indicate a first group identifier associated with the first subset of reference signal resources (e.g., a first group identifier associated with the first SRS antenna switching configuration) and the second group identifier associated with the second subset of reference signal resources (e.g., a second group identifier associated with the second SRS antenna switching configuration).

As also discussed above, the configuration signal may indicate a first periodicity for the first subset of reference signal resources (e.g., for the first reference signal switching configuration) and the second periodicity for the second subset of reference signal resources (e.g., for the second reference signal switching configuration). Accordingly, the trigger signal may activate the first reference signal switching configuration according to the first periodicity and the second reference signal switching configuration according to the second periodicity. For example, the trigger signal may activate both the first and second reference signal switching configurations according to their respective periodicities to run concurrently, but with different periodicities. In another example, the trigger signal may activate both the first and second reference signal switching configurations according to their respective periodicities to run consecutively, e.g., the first reference signal switching configuration may run according to the first periodicity for x time and, upon expiration of the first periodicity and/or x time, the second reference signal switching configuration may be automatically activated according to the second periodicity. In some aspects, the periodicities associated with the first and/or second reference signal switching configurations may be at the slot level (e.g., slot-level periodicity associated with the corresponding subset of reference signal resources).

Accordingly, wireless communication system 200-*b* of FIG. 2B introduces multiple groups of SRS resources within one SRS resource set for different SRS switching capabilities (e.g., for different SRS antenna switching configurations, or more simply reference signal switching configurations). In some wireless communication systems, up to 1/2/4 SRS resources may be allowed for one SRS resource set, and when one SRS resource set is activated/triggered, all of the SRS resources within the SRS resource set may be activated/triggered. However, wireless communication system 200-*b* allows more resources for one SRS resource set, with the SRS resources being associated with a usage for antenna switching. For example, new and/or modified RRC parameters in the SRS-resource configuration may be used to indicate whether this SRS resource will be activated/triggered together with the SRS resource set (e.g., introduce a group identifier, groupID, for SRS resources within one SRS resource set). Any number of SRS resource(s) can be activated/triggered together with the SRS resource set. For example, base station 210 may indicate to UE 205 which group of SRS resource(s) will be used for antenna switching, e.g., in the trigger signal.

Accordingly, aspects of the described techniques may introduce multiple groups of SRS resources within one SRS resource set (e.g., SRS resource set 255) for different SRS switching capabilities. This may include introducing or modifying RRC parameter(s), such as introducing a new switchingGroupID RRC parameter. Based on the switching group identifier, various other parameters may be different for the RRC configuration, including the periodicity and/or offset parameters (e.g., periodicity AndOffset). In one non-limiting example, this may include the example RRC parameter:

```
SRS-Resource ::=          SEQUENCE{
    srs-ResourceId        ,
    nrofSRS-Ports             ENUMERATED {port1, ports2, ports4},
    ptrs-PortIndex            ENUMERATED {n0, n1 }
OPTIONAL, -- Need R
    transmissionComb          CHOICE {
        n2                SEQUENCE {
            combOffset-n2            INTEGER (0..1),
            cyclicShift-n2           INTEGER (0..7)
        },
        n4                SEQUENCE }
            combOffset-n4            INTEGER (0..3),
            cyclicShift-n4           INTEGER (0..11)
        }
    },
    resourceMapping           SEQUENCE {
        startPosition            INTEGER (0..5),
```

-continued

```
    nrOfSymbols E           ENUMERATED {n1, n2, n4},
    repetitionFactor        ENUMERATED {n1, n2, n4}
},
freqDomainPosition          INTEGER (0..67),
freqDomainShift             INTEGER (0..268),
freqHopping                 SEQUENCE {
    c-SRS                   INTEGER (0..63),
    b-SRS                   INTEGER (0..3),
    b-hop                   INTEGER (0..3)
},
    groupOrSequenceHopping          ENUMERATED { neither, groupHopping,
sequenceHopping },
    resourceType            CHOICE{
      aperiodic             SEQUENCE {
        ...
      },
      semi-persistent       SEQUENCE {
        periodicityAndOffset-sp         SRS-PeriodicityAndOffset,
        ...
      },
      periodic              SEQUENCE {
        periodicityAndOffset-p          SRS-PeriodicityAndOffset,
        ...
      }
},
    sequenceId              INTEGER (0..1023),
    spatialRelationInfo         SRS-SpatialRelationInfo         OPTIONAL,
-- Need R
    switchingGroupID
    ...
}
```

In some aspects, base station 210 may configure UE 205 with the single reference signal resource set based on the capability of UE 205. As discussed above, UE 205 may transmit or otherwise convey a UE capability message to base station 210 identifying the SRS antenna switching capabilities of UE 205. In some aspects, the UE capability message may indicate support for multiple active reference signal switching configurations for a BWP. The multiple active reference signal switching configurations may include active reference signal switching configurations associated with different timing configurations. For example, some activated reference signal switching configurations may be associated with a persistent timing configuration, others may be associated with a semi-persistent timing configuration, while others are associated with an aperiodic timing configuration. One non-limiting example of the UE capability reported to base station 210 in the context of wireless communication system 200-b is illustrated in Table 2 below.

TABLE 2

| UE Capability | #SRS-Resource Set(s) for Antenna Switching |
|---|---|
| 1T2R | 2 |
| 2T4R | 2 |
| 1T4R | 4 |
| 1T4R | 4 |
| 1T = 1R | 1 |
| 2T = 2R | 1 |
| 4T = 4R | 1 |

With reference to wireless communication system 200-a and/or wireless communication system 200-b, base station 210 may include a group identifier in the configuration signal to distinguish between SRS resource sets and/or SRS resources within an SRS resource set associated with the different reference signal switching configurations. Accordingly, in some aspects the trigger signal may include a group identifiers corresponding to the first and/or second reference signal switching configurations to indicate to UE 205 which switching configuration(s) are activated. In some aspects, the trigger signal may include a trigger state indication indicating the first or second reference signal switching configurations, e.g., when the reference signals are aperiodic reference signals that are transmitted in accordance with the first and/or second reference signal switching configurations.

Accordingly, in some aspects the multiple SRS resource sets or single SRS resource set comprising multiple subsets of SRS resources corresponding to the different SRS antenna switching configurations may be DCI, MAC CE, etc., activated in a trigger signal transmitted from base station 210 to UE 205. The DCI/MAC CE-based trigger signal may activate/trigger different groups of SRS resource sets/SRS resources for SRS switching. This may include the indication of the group identifier, e.g., the MAC CE may select or otherwise indicate one or more group IDs for SRS switching, with UE 205 transmitting SRS (e.g., SRS 215, SRS 220, etc.) according to the configuration of the selected or indicated group. The trigger state indication may allow different groups of the aperiodic SRS transmissions for SRS switching being configured with different triggers states. When a DCI triggers one SRS trigger state, one group of SRS resources may be used (e.g., triggered/activated) for SRS switching. UE 205 will transmit the SRS based on the configuration of the selected group.

In some aspects, the techniques described with reference to wireless communication system 200-a and/or wireless communication system 200-b may be based on the capabilities of UE 205. That is, aspects of the described techniques allow UE 205 to report (e.g., in its UE capability message) whether it supports multiple antenna switching configurations per BWP. UE 205 may fall back to a single antenna switching configuration when configured by the network (e.g., when the network indicates to UE 205 one SRS switching configuration to use). Accordingly, UE 205 may transmit or otherwise convey a UE capability message to base station 210 indicating support for multiple reference signal switching configurations for a BWP. That is, UE 205 may transmit or otherwise convey an antenna switching capability of the UE in the UE capability message. When UE 205 is configured with multiple antenna configurations (e.g., multiple transmit and/or receive chains, antennas, and the like), UE 205 may transmit a first reference signal using a first antenna configuration (e.g., SRS 215) and a second reference signal using a second antenna configuration different from the first antenna configuration (e.g., SRS 220).

Figure 3:
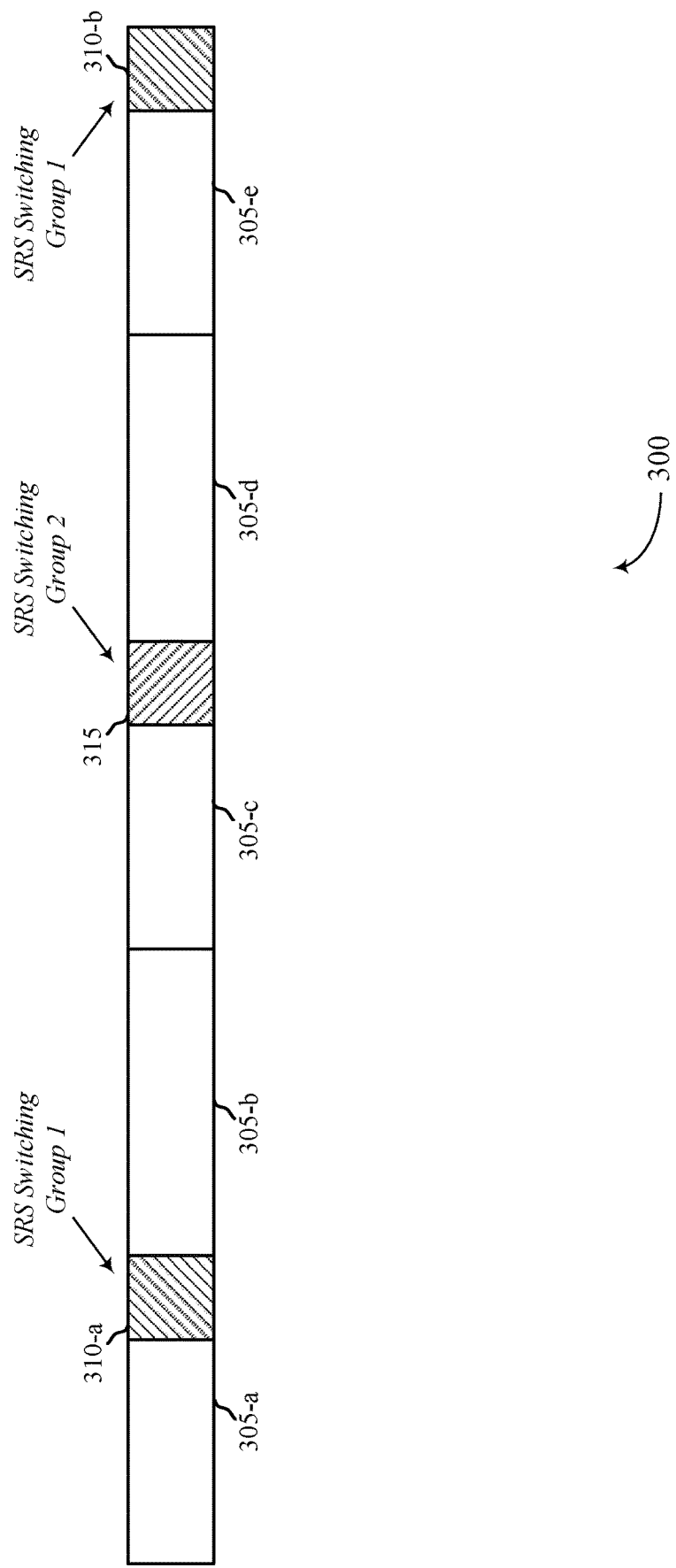
FIG. 3 illustrates an example of a sounding reference signal (SRS) switching configurations in accordance with aspects of the present disclosure.

FIG. 3 illustrates an example of a SRS switching configurations 300 that supports flexible SRS switching capability in accordance with aspects of the present disclosure. In some examples, SRS switching configurations 300 may implement aspects of wireless communication systems 100 and/or 200 (e.g., wireless communication system 200-*a* of FIG. 2A and/or wireless communication system 200-*b* of FIG. 2B). Aspects of SRS switching configuration 300 may be implemented by a UE and/or base station, which may be examples of the corresponding devices described herein.

As discussed above, aspects of the described techniques improve SRS switching operations performed between the UE and base station. For example, aspects of the described techniques provide a more flexible mechanism for dynamic SRS switching configurations. Broadly, aspects of the described techniques may support RRC configuration for SRS resources. In some examples, this may include introducing multiple groups of SRS resource sets for different SRS switching capabilities (e.g., for different SRS antenna switching configurations). In some examples, this may include introducing multiple groups of SRS resources within one SRS resource set for different SRS switching capabilities (e.g., for different SRS switching configurations). In some aspects, this may include indication signaling such as RRC-based periodical switching, MAC-CE and/or DCI-based switching indications (e.g., based on a group indication, a trigger state indication, and the like), such as a trigger signal activation/triggering. In some aspects, this may include, or be based on, different SRS resource-based periodicity configurations (e.g., timing configurations), UE capabilities, and the like.

More particularly, aspects of the described techniques may support the base station transmitting or otherwise conveying a configuration signal to the UE indicating one or more reference signal resource sets (e.g., SRS resource set(s)). In some aspects, the one or more reference signal resource sets may include a first subset of reference signal resources (e.g., SRS resources) associated with a first reference signal switching configuration (e.g., a first SRS antenna switching configuration) and a second subset of reference signal resources associated with a second reference signal switching configuration. The base station may transmit or otherwise convey a trigger signal to the UE that activates the first reference signal switching configuration and/or the second reference signal switching configuration. The UE may, based on the trigger signal, transmit reference signals (e.g., SRS transmissions) according to the first subset of reference signal resources (e.g., SRS resources) and/or the second subset of reference signal resources. This may include the configuration signal indicating a plurality of reference signal resource sets, with different reference signal resource sets associated with the corresponding different reference signal switching configurations and/or the configuration signal may indicate a single reference signal resource set, with different reference signal resources (e.g., SRS resources) of the set associated with the corresponding different reference signal switching configurations.

In some aspects, each of the reference signal switching configurations may be associated with a corresponding group identifier (e.g., at the SRS resource set level and/or at the SRS resource level within an SRS resource set). The base station may indicate the group identifier in the trigger signal to identify which reference signal switching configuration is being activated/triggered. In some aspects, the configuration and/or trigger signal may carry or otherwise convey an indication of a unique periodicity for each reference signal switching configuration. For example, the configuration signal may indicate a first periodicity for the first subset of reference signal resource sets/reference signal resources and/or a second periodicity for the second subset of reference signal resource sets/reference signal resources. Accordingly, the trigger signal may activate different reference signal switching configurations according to their unique periodicity. For example, the trigger signal may activate/trigger a first reference signal switching configuration according to the first periodicity, a second reference signal switching configuration according to a second periodicity, and so forth. For example, some activated reference signal switching configurations may be associated with a persistent timing configuration, others may be associated with a semi-persistent timing configuration, while others are associated with an aperiodic timing configuration.

SRS switching configuration 300 illustrates one non-limiting example of different periodicities associated with the corresponding reference signal switching configurations (e.g., SRS antenna switching configurations). Broadly, the SRS switching configuration spans a plurality of slots 305, with five slots 305 being shown by way of example only. The UE may receive a trigger signal activating a first reference signal switching configuration (e.g., the trigger signal may indicate a first group identifier corresponding to, or otherwise associated with, the first reference signal switching configuration) according to the first periodicity and/or activating a second reference signal switching configuration (e.g., the trigger signal may indicate a second group identifier corresponding to, or otherwise associated with, the second reference signal switching configuration) according to the second periodicity. As discussed above, the trigger signal may activate the first and second reference signal switching configurations to run concurrently or consecutively (e.g., the second reference signal switching configuration is activated according to the second periodicity upon expiration of a predetermined time period, such as, but not limited to, the first periodicity).

Accordingly, the UE may transmit one or more reference signals according to the first subset of reference signal resources (e.g., when the trigger signal activates the first reference signal switching configuration) according to the first periodicity and/or one or more references according to the second subset of reference signal resources (e.g., when the trigger signal activates a second reference signal switching configuration) according to the second periodicity. That is, the UE may perform SRS transmissions 310-*a* (corresponding to the first group identifier associated with the first reference signal switching configuration) during slot 305-*a* and SRS transmissions 310-*b* (also corresponding to the first group identifier associated with the first reference signal switching configuration) during slot 305-*e* according to the first periodicity. The UE may perform SRS transmissions 315 during slot 305-*c* according to the second periodicity.

Accordingly, SRS switching configuration 300 illustrates an example allowing periodical change to the activated/ triggered group of SRS resource sets/SRS resources. This may include a new RRC parameter corresponding to the periodicity for the SRS resource sets/SRS resources changes. The periodicity of the SRS resource sets/SRS resources within the same group (e.g., corresponding to the same group identifier) may be the same. The UE may change to another group of SRS resource sets/SRS resources for SRS switching according to the corresponding periodicity.

In some aspects, this may include the activation/trigger signal indicating two or more SRS resource sets for antenna switching in different groups simultaneously. The two or more SRS resource sets and corresponding SRS resources may be configured with different periodicities, slot offsets, and the like.

Figure 4:
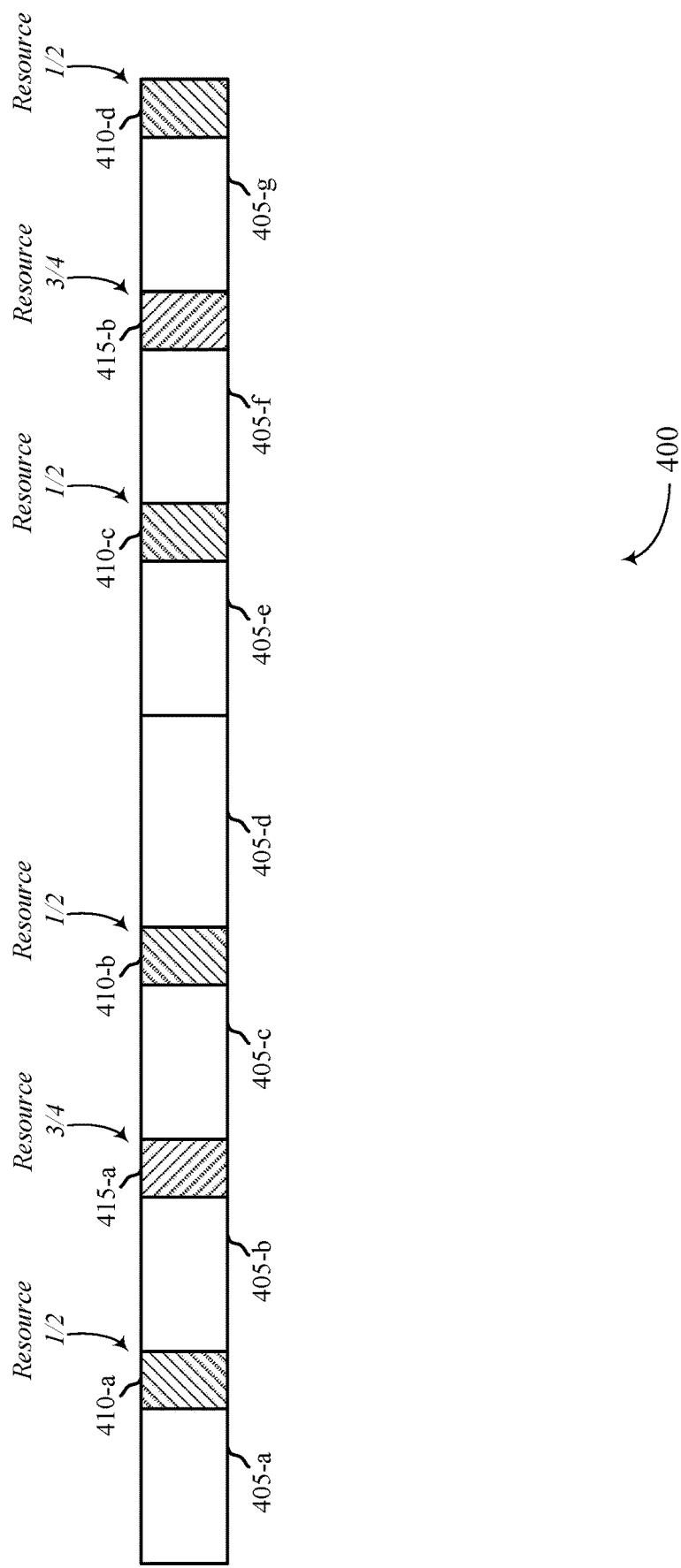
FIG. 4 illustrates an example of a SRS switching configurations in accordance with aspects of the present disclosure.

FIG. 4 illustrates an example of a SRS switching configurations 400 that supports flexible SRS switching capability in accordance with aspects of the present disclosure. In some examples, SRS switching configurations 400 may implement aspects of wireless communication systems 100 and/or 200 and/or SRS switching configuration 300. Aspects of SRS switching configuration 400 may be implemented by a UE and/or base station, which may be examples of the corresponding devices described herein.

As discussed above, aspects of the described techniques improve SRS switching operations performed between the UE and base station. For example, aspects of the described techniques provide a more flexible mechanism for dynamic SRS switching configurations. Broadly, aspects of the described techniques may support RRC configuration for SRS resources. In some examples, this may include introducing multiple groups of SRS resource sets for different SRS switching capabilities (e.g., for different SRS antenna switching configurations). In some examples, this may include introducing multiple groups of SRS resources within one SRS resource set for different SRS switching capabilities (e.g., for different SRS switching configurations). In some aspects, this may include indication signaling such as RRC-based periodic switching, MAC-CE and/or DCI-based switching indications (e.g., based on a group indication, a trigger state indication, and the like), such as a triggering signal activation/triggering. In some aspects, this may include, or be based on, different SRS resource-based periodicity configurations, UE capabilities, and the like.

More particularly, aspects of the described techniques may support the base station transmitting or otherwise conveying a configuration signal to the UE indicating one or more reference signal resource sets (e.g., SRS resource set(s)). In some aspects, the one or more reference signal resource sets may include a first subset of reference signal resources (e.g., SRS resources) associated with a first reference signal switching configuration (e.g., a first SRS antenna switching configuration) and a second subset of reference signal resources associated with a second reference signal switching configuration. The base station may transmit or otherwise convey a trigger signal to the UE that activates the first reference signal switching configuration and/or the second reference signal switching configuration. The UE may, based on the trigger signal, transmit reference signals (e.g., SRS transmissions) according to the first subset of reference signal resources (e.g., SRS resources) and/or the second subset of reference signal resources, e.g., based on the trigger signal. This may include the configuration signal indicating a plurality of reference signal resource sets, with different reference signal resource sets associated with the corresponding different reference signal switching configurations and/or the configuration signal may indicate a single reference signal resource set, with different reference signal resources (e.g., SRS resources) of the set associated with the corresponding different reference signal switching configurations.

In some aspects, each of the reference signal switching configurations may be associated with a corresponding group identifier (e.g., at the SRS resource set level and/or at the SRS resource level within an SRS resource set). The base station may indicate the group identifier in the trigger signal to identify which reference signal switching configuration is being activated/triggered. In some aspects, the configuration and/or trigger signal may carry or otherwise convey an indication of a unique periodicity for each reference signal switching configuration. For example, the configuration signal may indicate a first periodicity for the first subset of reference signal resource sets/reference signal resources and/or a second periodicity for the second subset of reference signal resource sets/reference signal resources. Accordingly, the trigger signal may activate different reference signal switching configurations according to their unique periodicity. For example, the trigger signal may activate a first reference signal switching configuration according to the first periodicity, a second reference signal switching configuration according to a second periodicity, and so forth.

SRS switching configuration 400 illustrates one non-limiting example of different periodicities associated with the corresponding reference signal switching configurations (e.g., SRS antenna switching configurations). In some aspects, SRS switching configuration 400 supports SRS resource-based periodicity configurations (e.g., timing configurations). That is, SRS switching configuration 400 allows different periodicity values for SRS resources in an SRS resource set to be used for antenna switching. Broadly, SRS switching configuration 400 spans a plurality of slots 405, with seven slots 405 being shown by way of example only. The UE may receive a trigger signal activating a first reference signal switching configuration (e.g., the trigger signal may indicate a first group identifier corresponding to, or otherwise associated with, the first reference signal switching configuration) according to the first periodicity and/or activating a second reference signal switching configuration (e.g., the trigger signal may indicate a second group identifier corresponding to, or otherwise associated with, the second reference signal switching configuration) according to the second periodicity. The first reference signal switching configuration may be associated with a first subset of reference signal resources (e.g., SRS resource 1/2) and the second reference signal switching configuration may be associated with a second subset of reference signal resources (e.g., SRS resource 3/4) of an SRS resource set. As discussed above, the trigger signal may activate the first and second reference signal switching configurations to run concurrently or consecutively (e.g., the second reference signal switching configuration is activated according to the second periodicity upon expiration of a predetermined time period, such as, but not limited to, the first periodicity).

Accordingly, the UE may transmit one or more reference signals according to the first subset of reference signal resources (e.g., when the trigger signal activates the first reference signal switching configuration) according to the first periodicity and/or one or more references according to the second subset of reference signal resources (e.g., when the trigger signal activates a second reference signal switching configuration) according to the second periodicity. That is, the UE may perform SRS transmission 410-*a* during slot 405-*a*, SRS transmission 410-*b* during slot 405-*c*, SRS transmission 410-*c* during slot 405-*e*, and SRS transmission 410-*d* during slot 405-*g* according to the first periodicity. In some aspects, the SRS transmissions 410 may correspond to the first group identifier associated with the first reference signal switching configuration using SRS resources 1/2. Similarly, the UE may perform SRS transmissions 415-*a* during slot 405-*b* and SRS transmissions 415-*b* during slot 405-*f* according to the second periodicity. In some aspects, the SRS transmissions 415 may correspond to the second group identifier associated with the second reference signal switching configuration using SRS resources 3/4.

Accordingly, SRS switching configuration 400 illustrates an example allowing SRS resource-based periodicity configuration. This may allow different periodicity values for SRS resources in an SRS set being used for SRS antenna switching configurations. For periodic and/or semi-persistent SRS transmissions, this may allow or otherwise support different periodicities for the SRS resources. For example, for 1T4R, each SRS resource in the SRS resource set may include a single SRS port, and the SRS port of each SRS resource may be associated with a different UE antenna port. The periodicity of the first two SRS resources may be different from the second two SRS resources. The first two SRS resources (e.g., SRS 1/2) may be used for 1T2R SRS antenna switching.

Figure 5:
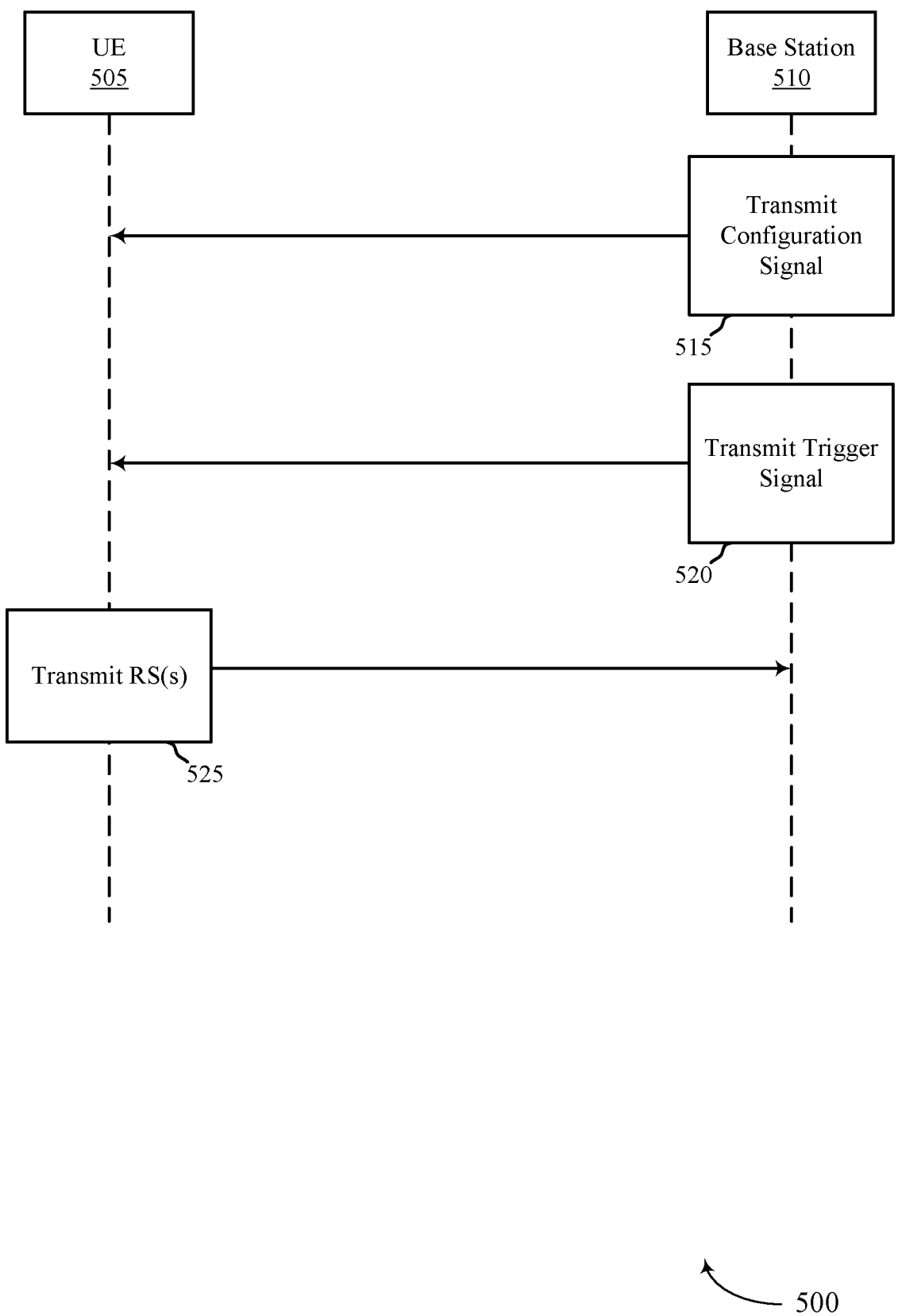
FIG. 5 illustrates an example of a process that supports flexible SRS switching capability in accordance with aspects of the present disclosure.

FIG. 5 illustrates an example of a process 500 that supports flexible SRS switching capability in accordance with aspects of the present disclosure. In some examples, process 500 may implement aspects of wireless communication systems 100 and/or 200 and/or SRS switching configurations 300 and/or 400. Aspects of process 500 may be implemented by a base station 510 and/or UE 505, which may be examples of the corresponding devices described herein.

At 515, base station 510 may transmit (and UE 505 may receive) a configuration signal identifying or otherwise indicating one or more reference signal resource sets. Examples of the one or more reference signal resource sets include, but are not limited to, SRS resource sets. The one or more reference signal resource sets may include a first subset of reference signal resources (e.g., SRS resources) associated with a first reference signal switching configuration and a second subset of reference signal resources associated with a second reference signal switching configuration.

In some aspects, this may include base station 510 transmitting (and UE 505 receiving) the configuration signal that indicates a plurality of reference signal resource sets. The plurality of reference signal resource sets may include at least a first reference signal resource set including the first subset of reference signal resources associated with the first reference signal switching configuration and a second reference signal resource set including the second subset of reference signal resources associated with the second reference signal switching configuration. In some aspects, this may include base station 510 transmitting (and UE 505 receiving) the configuration signal that indicates a first group identifier associated with the first reference signal resource set and a second group identifier associated with the second reference signal resource set. In some aspects, this may include base station 510 transmitting (and UE 505 receiving) the configuration signal that indicates a first periodicity for the first reference signal resource set and a second periodicity for the second reference signal resource set.

In some aspects, this may include base station 510 transmitting (and UE 505 receiving) the configuration signal that indicates a single reference signal resource set. The single reference signal resource set may include at least the first subset of reference signal resources associated with the first reference signal switching configuration and the second subset of reference signal resources associated with the second reference signal switching configuration. In some aspects, this may include base station 510 transmitting (and UE 505 receiving) the configuration signal that indicates the first group identifier associated with the first subset of reference signal resources and a second group identifier associated with the second subset of reference signal resources. The trigger signal may activate the first subset of reference signal resources and/or the second subset of reference signal resources. In some aspects, this may include base station 510 transmitting (and UE 505 receiving) the configuration signal that indicates a first periodicity for the first subset of reference signal resources and the second periodicity for the second subset of reference signal resources.

In some aspects, this may include base station 510 transmitting (and UE 505 receiving) a configuration signal that indicates a first slot-level periodicity associated with the first subset of reference signal resources and a second slot-level periodicity associated with the second subset of reference signal resources that differs from the first slot-level periodicity.

In some aspects, this may be based on UE 505 transmitting (and base station 510 receiving) a UE capability message indicating support for multiple reference signal switching configurations for a BWP. The UE capability message may indicate an antenna switching capability of UE 505. The configuration signal may be based, at least in some aspects, on the UE capability message.

In some aspects, this may be based on UE 505 transmitting (and base station 510 receiving) a UE capability message indicating support for multiple active reference signal switching configurations for a BWP. The multiple active reference signal switching configurations may include active reference signal switching configurations associated with different timing configurations. The configuration signal may be based, at least in some aspects, on the UE capability message.

At 520, base station 510 may transmit (and UE 505 may receive) a trigger signal activating the first reference signal switching configuration and/or the second reference signal switching configuration. In some aspects, the trigger signal may include a DCI and/or a MAC CE.

In some aspects, this may include base station 510 transmitting (and UE 505 receiving) the trigger signal that activates the first reference signal switching configuration according to the first periodicity for the first reference signal resource set and the second reference signal switching configuration according to the second periodicity for the second reference signal resource set. In some aspects, this may include base station 510 transmitting (and UE 505 receiving) the trigger signal that activates the first reference signal switching configuration according to the first periodicity for the first reference signal resource set and, upon expiration of the first periodicity, activating the second reference signal switching configuration according to the second periodicity for the second reference signal resource set.

In some aspects, this may include base station 510 transmitting (and UE 505 receiving) the trigger signal that activates the first reference signal switching configuration according to the first periodicity for the first subset of reference signal resources and the second reference signal switching configuration according to the second periodicity for the second subset of reference signal resources. In some aspects, this may include base station 510 transmitting (and UE 505 receiving) the trigger signal that activates the first reference signal switching configuration according to the first periodicity for the first subset of reference signal resources and, upon expiration of the first periodicity, activates the second reference signal switching configuration according to the second periodicity for the second subset of reference signal resources.

In some aspects, this may include base station 510 transmitting (and UE 505 receiving) the trigger signal that includes a group identifier that indicates the first reference signal switching configuration and/or the second reference signal switching configuration. The reference signals may be transmitted in accordance with the first reference signal switching configuration or the second reference signal switching configuration corresponding to the group identifier.

In some aspects, this may include base station 510 transmitting (and UE 505 receiving) the trigger signal that includes a trigger state indication that indicates the first reference signal switching configuration and/or the second reference signal switching configuration. The reference signals may be aperiodic reference signals that are transmitted in accordance with the first reference signal switching configuration or the second reference signal switching configuration corresponding to the trigger state indication.

At 525, UE 505 may transmit (and base station 510 may receive) reference signals transmitted according to the first subset of reference signal resources for the second subset of reference signal resources, e.g., based on the trigger signal. In some aspects, this may include UE 505 transmitting (and base station 510 receiving) a first one or more reference signals using a first antenna configuration and a second one or more reference signals using a second antenna configuration different from the first antenna configuration.

Figure 6:
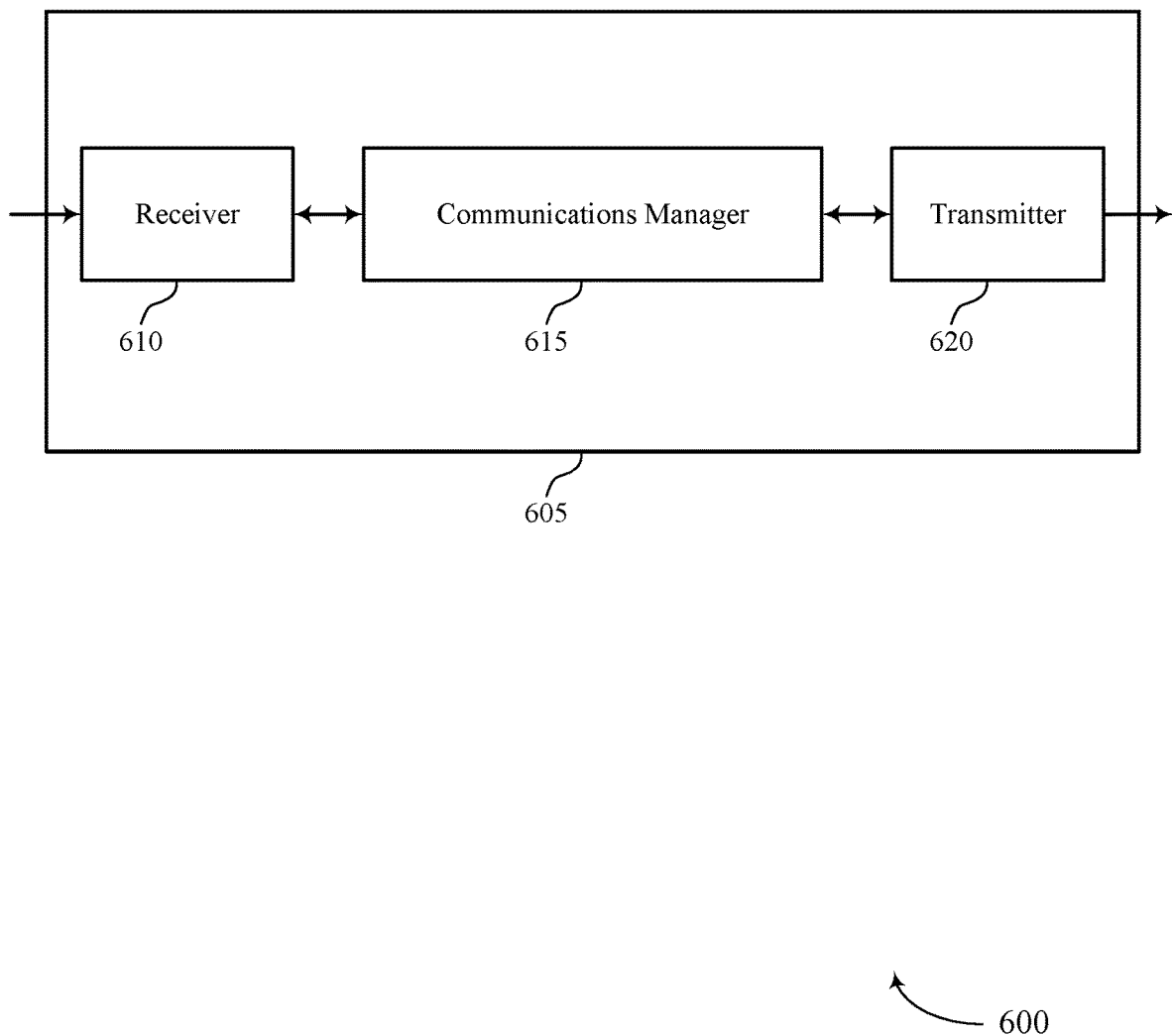
FIGS. 6 and 7 show block diagrams of devices in accordance with aspects of the present disclosure.

FIG. 6 shows a block diagram 600 of a device 605 that supports flexible SRS switching capability in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to support of flexible SRS switching capability, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive a configuration signal indicating one or more reference signal resource sets, the one or more reference signal resource sets including at least a first subset of reference signal resources associated with a first reference signal switching configuration and a second subset of reference signal resources associated with a second reference signal switching configuration, receive a trigger signal activating at least the first reference signal switching configuration or the second reference signal switching configuration, and transmit, based on the trigger signal, reference signals according to the first subset of reference signal resources or second subset of reference signal resources. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
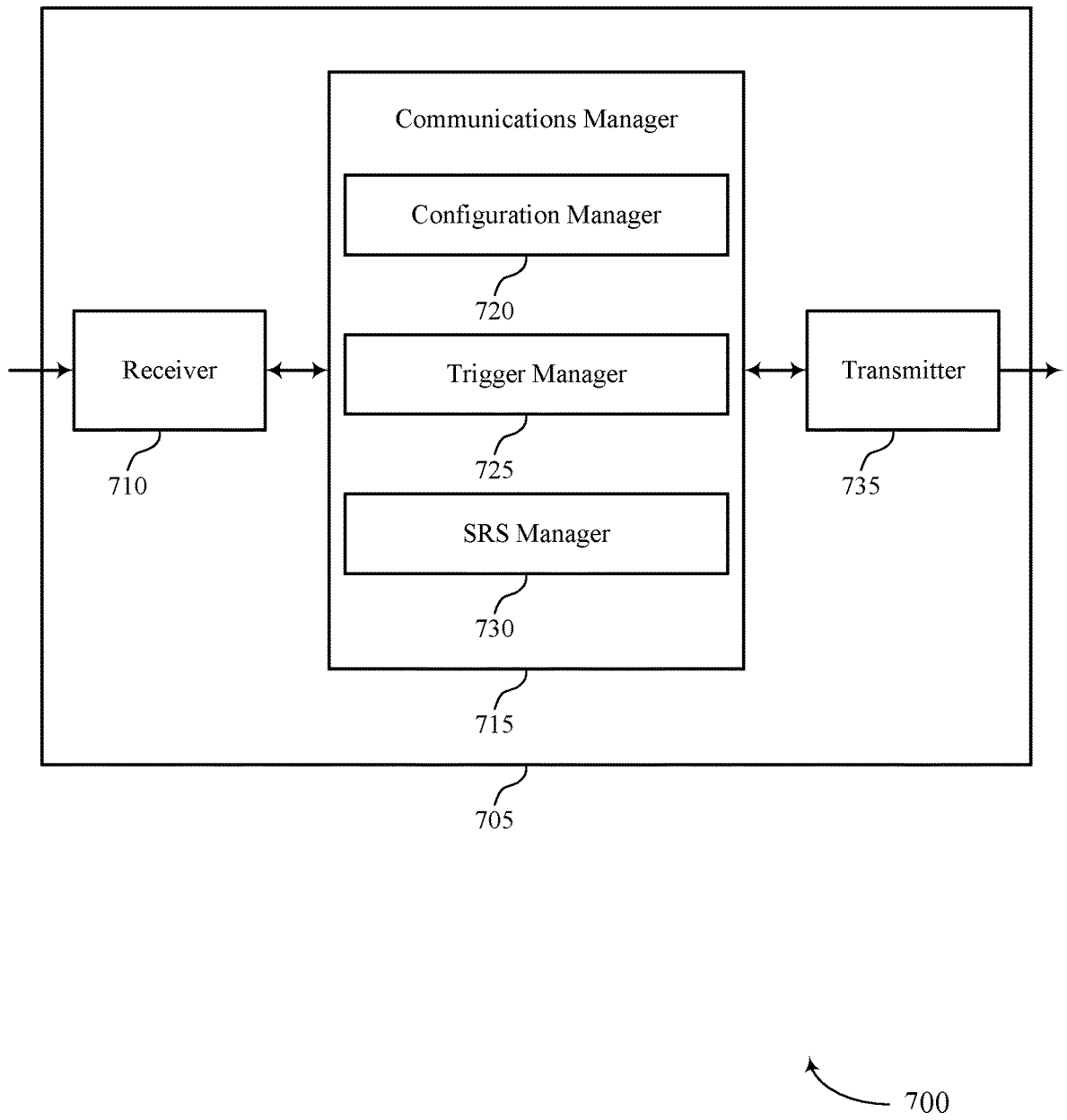

FIG. 7 shows a block diagram 700 of a device 705 that supports flexible SRS switching capability in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to support of flexible SRS switching capability, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a configuration manager 720, a trigger manager 725, and a SRS manager 730. The communications manager 715 may be an example of aspects of the communications manager 910 described herein.

The configuration manager 720 may receive a configuration signal indicating one or more reference signal resource sets, the one or more reference signal resource sets including at least a first subset of reference signal resources associated with a first reference signal switching configuration and a second subset of reference signal resources associated with a second reference signal switching configuration.

The trigger manager 725 may receive a trigger signal activating at least the first reference signal switching configuration or the second reference signal switching configuration.

The SRS manager 730 may transmit, based on the trigger signal, reference signals according to the first subset of reference signal resources or second subset of reference signal resources.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
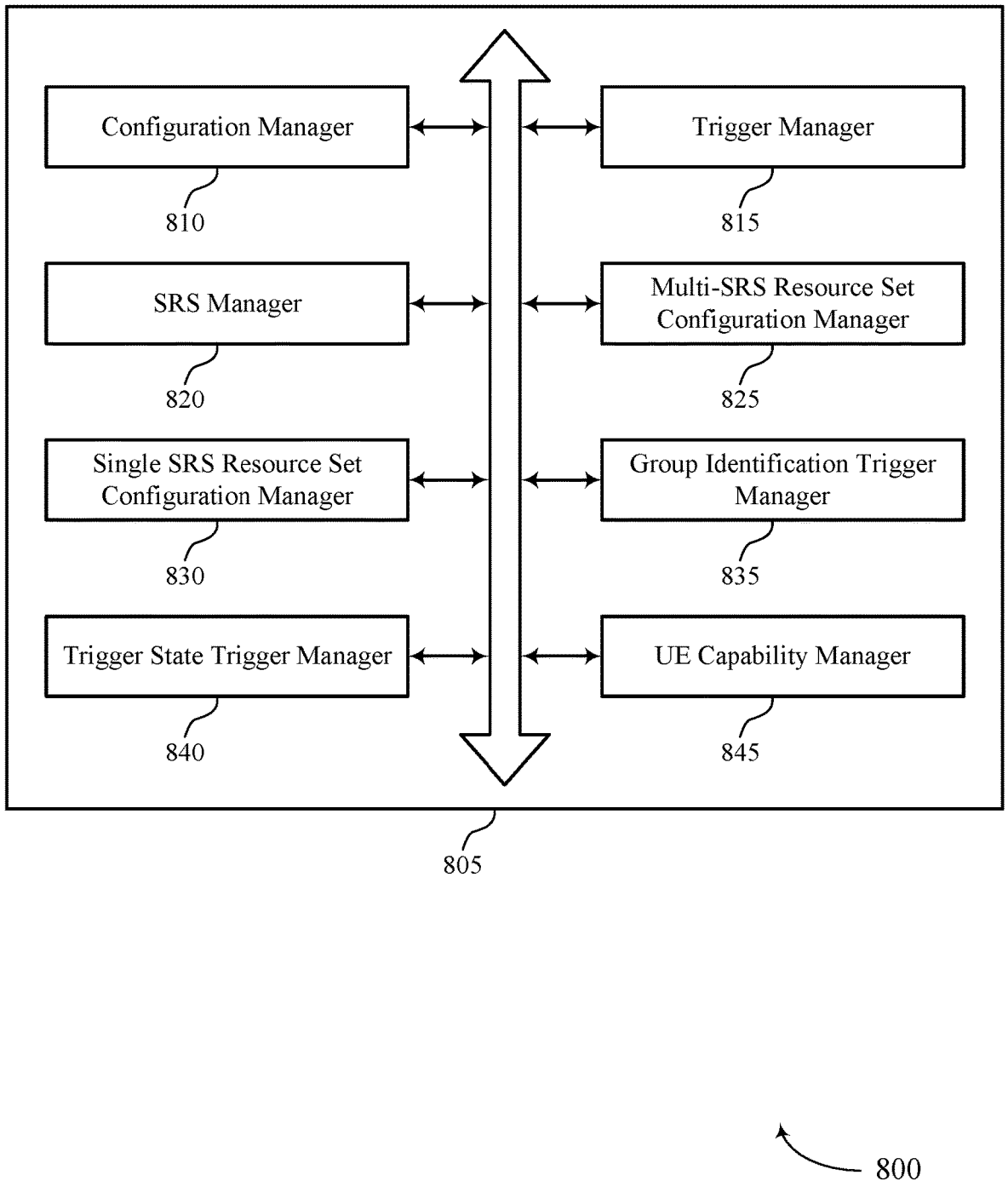
FIG. 8 shows a block diagram of a communications manager in accordance with aspects of the present disclosure.

FIG. 8 shows a block diagram 800 of a communications manager 805 that supports flexible SRS switching capability in accordance with aspects of the present disclosure. The communications manager 805 may be an example of aspects of a communications manager 615, a communications manager 715, or a communications manager 910 described herein. The communications manager 805 may include a configuration manager 810, a trigger manager 815, a SRS manager 820, a multi-SRS resource set configuration manager 825, a single SRS resource set configuration manager 830, a group identification trigger manager 835, a trigger state trigger manager 840, and an UE capability manager 845. Each of these modules may communicate, directly or indirectly, with one another (e.g., via one or more buses).

The configuration manager 810 may receive a configuration signal indicating one or more reference signal resource sets, the one or more reference signal resource sets including at least a first subset of reference signal resources associated with a first reference signal switching configuration and a second subset of reference signal resources associated with a second reference signal switching configuration.

The trigger manager 815 may receive a trigger signal activating at least the first reference signal switching configuration or the second reference signal switching configuration. In some cases, the trigger signal includes a DCI or a MAC CE.

The SRS manager 820 may transmit, based on the trigger signal, reference signals according to the first subset of reference signal resources or second subset of reference signal resources. In some examples, the SRS manager 820 may transmit a first one or more reference signals using a first antenna configuration. In some examples, the SRS manager 820 may transmit a second one or more reference signals using a second antenna configuration different from the first antenna configuration.

The multi-SRS resource set configuration manager 825 may receive the configuration signal that indicates a set of reference signal resource sets, the set of reference signal resource sets including at least a first reference signal resource set including the first subset of reference signal resources associated with the first reference signal switching configuration and a second reference signal resource set including the second subset of reference signal resources associated with the second reference signal switching configuration. In some examples, the multi-SRS resource set configuration manager 825 may receive the configuration signal that indicates a first group identifier associated with the first reference signal resource set and a second group identifier associated with the second reference signal resource set. In some examples, the multi-SRS resource set configuration manager 825 may receive the configuration signal that indicates a first periodicity for the first reference signal resource set and a second periodicity for the second reference signal resource set. In some examples, the multi-SRS resource set configuration manager 825 may receive the trigger signal that activates the first reference signal switching configuration according to the first periodicity for the first reference signal resource set and the second reference signal switching configuration according to the second periodicity for the second reference signal resource set. In some examples, the multi-SRS resource set configuration manager 825 may receive the trigger signal that activates the first reference signal switching configuration according to the first periodicity for the first reference signal resource set and, upon expiration of the first periodicity, activates the second reference signal switching configuration according to the second periodicity for the second reference signal resource set.

The single SRS resource set configuration manager 830 may receive the configuration signal that indicates a single reference signal resource set, the single reference signal resource set including at least the first subset of reference signal resources associated with the first reference signal switching configuration and the second subset of reference signal resources associated with the second reference signal switching configuration. In some examples, the single SRS resource set configuration manager 830 may receive the configuration signal that indicates a first group identifier associated with the first subset of reference signal resources and a second group identifier associated with the second subset of reference signal resources, where the trigger signal activates the first subset of reference signal resources or the second subset of reference signal resources.

In some examples, the single SRS resource set configuration manager 830 may receive the configuration signal that indicates a first periodicity for the first subset of reference signal resources and a second periodicity for the second subset of reference signal resources. In some examples, the single SRS resource set configuration manager 830 may receive the trigger signal that activates the first reference signal switching configuration according to the first periodicity for the first subset of reference signal resources and the second reference signal switching configuration according to the second periodicity for the second subset of reference signal resources.

In some examples, the single SRS resource set configuration manager 830 may receive the trigger signal that activates the first reference signal switching configuration according to the first periodicity for the first subset of reference signal resources and, upon expiration of the first periodicity, activates the second reference signal switching configuration according to the second periodicity for the second subset of reference signal resources. In some examples, the single SRS resource set configuration manager 830 may receive the configuration signal that indicates a first slot-level periodicity associated with the first subset of reference signal resources and a second slot-level periodicity associated with the second subset of reference signal resources that differs from the first slot-level periodicity.

The group identification trigger manager 835 may receive the trigger signal that includes a group identifier that indicates one of the first reference signal switching configuration or the second reference signal switching configuration, where the reference signals are transmitted in accordance with the first reference signal switching configuration or the second reference signal switching configuration corresponding to the group identifier.

The trigger state trigger manager 840 may receive the trigger signal that includes a trigger state indication that indicates one of the first reference signal switching configuration or the second reference signal switching configuration, where the reference signals are aperiodic reference signals that are transmitted in accordance with the first reference signal switching configuration or the second reference signal switching configuration corresponding to the trigger state indication.

The UE capability manager 845 may transmit a UE capability message indicating support for multiple reference signal switching configurations for a BWP, where the configuration signal is based on the UE capability message.

In some examples, the UE capability manager 845 may transmit a UE capability message indicating an antenna switching capability of the UE, where the configuration signal is based on the antenna switching capability.

In some examples, the UE capability manager 845 may transmit a UE capability message indicating support for multiple active reference signal switching configurations for a BWP, the multiple active reference signal switching configurations comprising active reference signal switching configurations associated with different timing configurations, wherein the configuration signal is based at least in part on the UE capability message.

Figure 9:
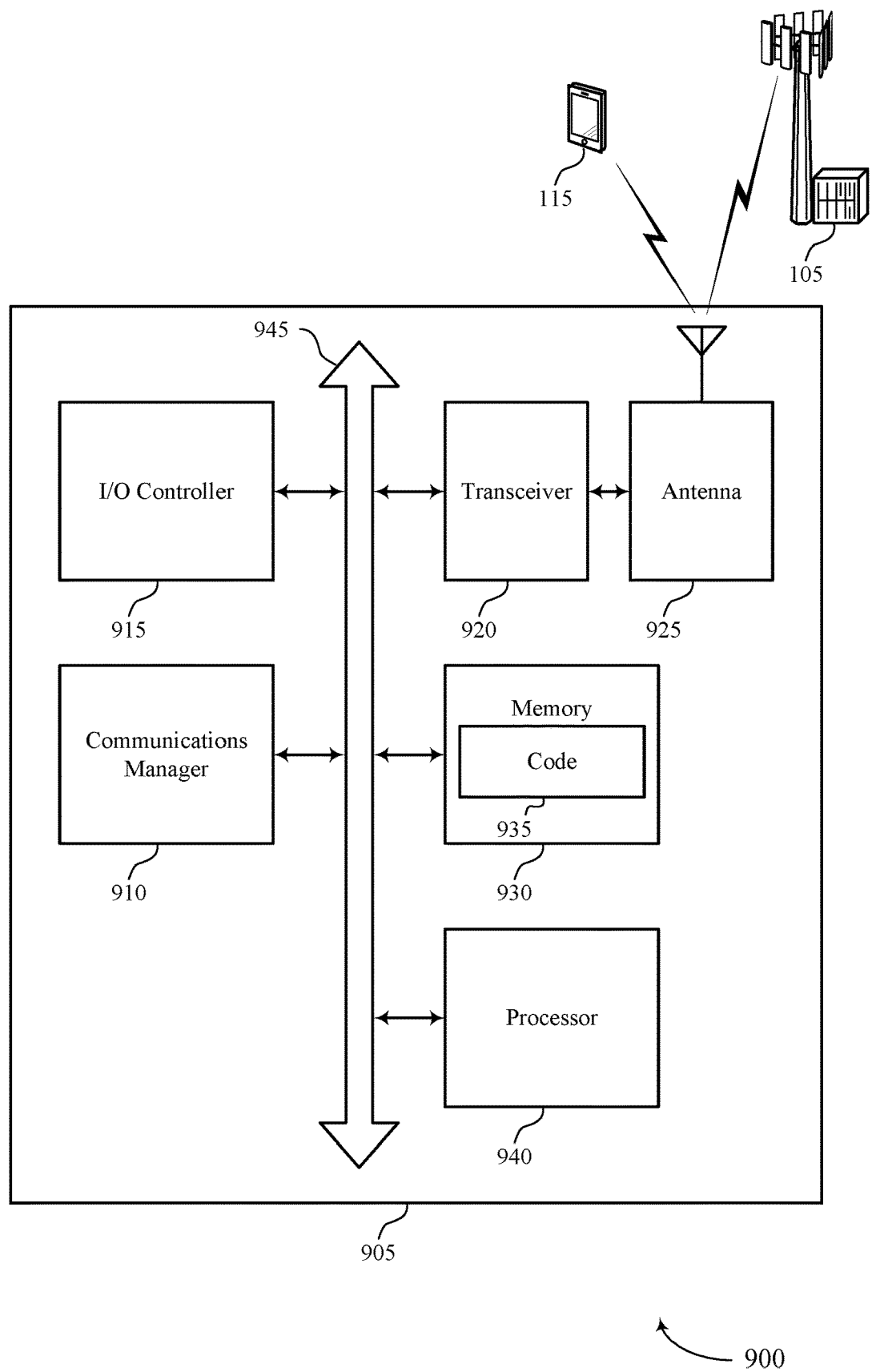
FIG. 9 shows a diagram of a system including a device that supports flexible SRS switching capability in accordance with aspects of the present disclosure.

FIG. 9 shows a diagram of a system 900 including a device 905 that supports flexible SRS switching capability in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive a configuration signal indicating one or more reference signal resource sets, the one or more reference signal resource sets including at least a first subset of reference signal resources associated with a first reference signal switching configuration and a second subset of reference signal resources associated with a second reference signal switching configuration, receive a trigger signal activating at least the first reference signal switching configuration or the second reference signal switching configuration, and transmit, based on the trigger signal, reference signals according to the first subset of reference signal resources or second subset of reference signal resources.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting support of flexible SRS switching capability).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
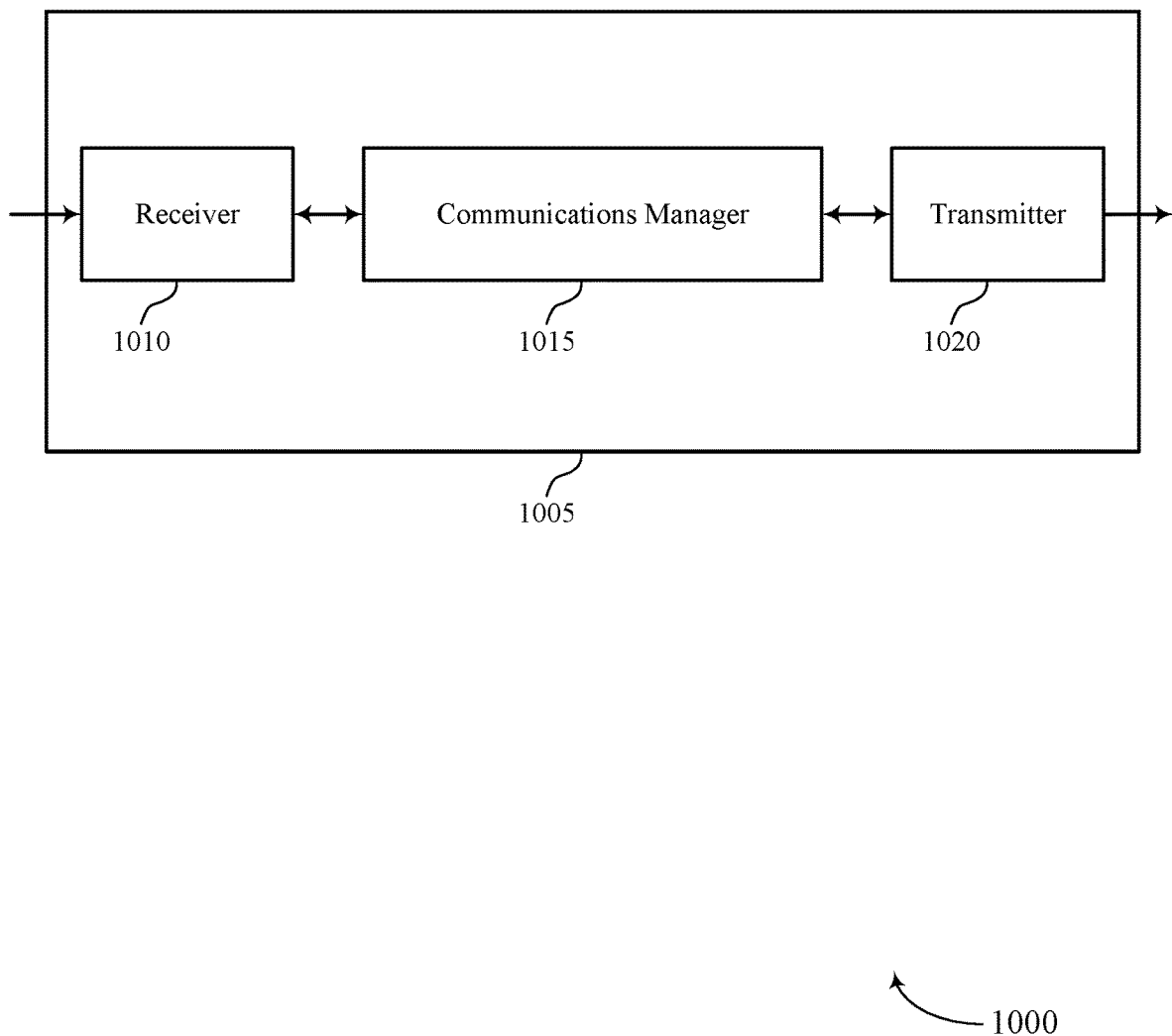
FIGS. 10 and 11 show block diagrams of devices in accordance with aspects of the present disclosure.

FIG. 10 shows a block diagram 1000 of a device 1005 that supports flexible SRS switching capability in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to support of flexible SRS switching capability, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to a UE, a configuration signal indicating one or more reference signal resource sets, the one or more reference signal resource sets including at least a first subset of reference signal resources associated with a first reference signal switching configuration and a second subset of reference signal resources associated with a second reference signal switching configuration, transmit a trigger signal activating at least the first reference signal switching configuration or the second reference signal switching configuration, and receive, based on the trigger signal, reference signals according to the first subset of reference signal resources or second subset of reference signal resources. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
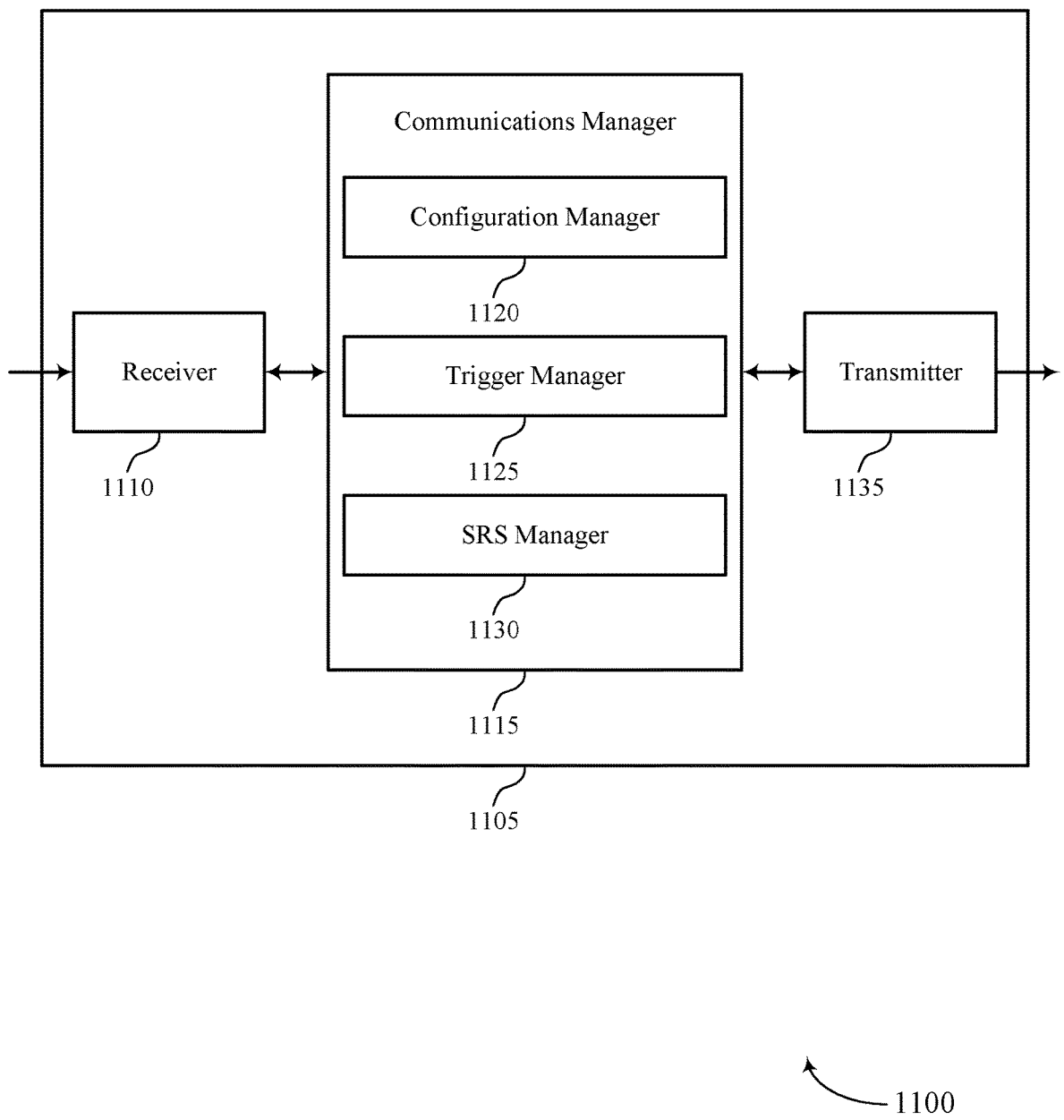

FIG. 11 shows a block diagram 1100 of a device 1105 that supports flexible SRS switching capability in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to support of flexible SRS switching capability, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a configuration manager 1120, a trigger manager 1125, and a SRS manager 1130. The communications manager 1115 may be an example of aspects of the communications manager 1310 described herein.

The configuration manager 1120 may transmit, to a UE, a configuration signal indicating one or more reference signal resource sets, the one or more reference signal resource sets including at least a first subset of reference signal resources associated with a first reference signal switching configuration and a second subset of reference signal resources associated with a second reference signal switching configuration.

The trigger manager 1125 may transmit a trigger signal activating at least the first reference signal switching configuration or the second reference signal switching configuration.

The SRS manager 1130 may receive, based on the trigger signal, reference signals according to the first subset of reference signal resources or second subset of reference signal resources.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
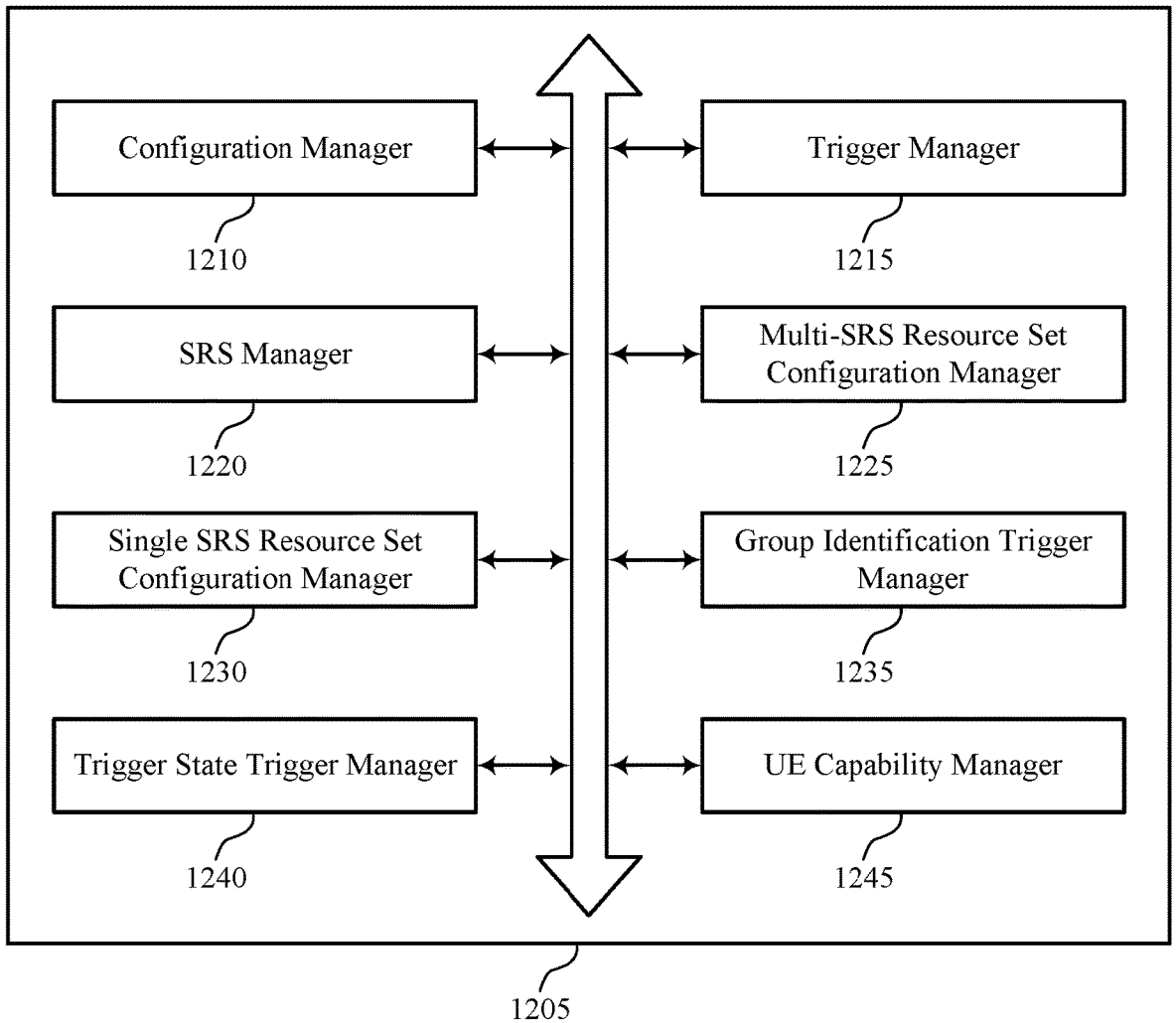
FIG. 12 shows a block diagram of a communications manager in accordance with aspects of the present disclosure.

FIG. 12 shows a block diagram 1200 of a communications manager 1205 that supports flexible SRS switching capability in accordance with aspects of the present disclosure. The communications manager 1205 may be an example of aspects of a communications manager 1015, a communications manager 1115, or a communications manager 1310 described herein. The communications manager 1205 may include a configuration manager 1210, a trigger manager 1215, a SRS manager 1220, a multi-SRS resource set configuration manager 1225, a single SRS resource set configuration manager 1230, a group identification trigger manager 1235, a trigger state trigger manager 1240, and an UE capability manager 1245. Each of these modules may communicate, directly or indirectly, with one another (e.g., via one or more buses).

The configuration manager 1210 may transmit, to a UE, a configuration signal indicating one or more reference signal resource sets, the one or more reference signal resource sets including at least a first subset of reference signal resources associated with a first reference signal switching configuration and a second subset of reference signal resources associated with a second reference signal switching configuration.

The trigger manager 1215 may transmit a trigger signal activating at least the first reference signal switching configuration or the second reference signal switching configuration. In some cases, the trigger signal includes a DCI or a MAC CE.

The SRS manager 1220 may receive, based on the trigger signal, reference signals according to the first subset of reference signal resources or second subset of reference signal resources. In some examples, the SRS manager 1220 may receive a first one or more reference signals using a first antenna configuration. In some examples, the SRS manager 1220 may receive a second one or more reference signals using a second antenna configuration different from the first antenna configuration.

The multi-SRS resource set configuration manager 1225 may transmit the configuration signal that indicates a set of reference signal resource sets, the set of reference signal resource sets including at least a first reference signal resource set including the first subset of reference signal resources associated with the first reference signal switching configuration and a second reference signal resource set including the second subset of reference signal resources associated with the second reference signal switching configuration. In some examples, the multi-SRS resource set configuration manager 1225 may transmit the configuration signal that indicates a first group identifier associated with the first reference signal resource set and a second group identifier associated with the second reference signal resource set.

In some examples, the multi-SRS resource set configuration manager 1225 may transmit the configuration signal that indicates a first periodicity for the first reference signal resource set and a second periodicity for the second reference signal resource set. In some examples, the multi-SRS resource set configuration manager 1225 may transmit the trigger signal that activates the first reference signal switching configuration according to the first periodicity for the first reference signal resource set and the second reference signal switching configuration according to the second periodicity for the second reference signal resource set.

In some examples, the multi-SRS resource set configuration manager 1225 may transmit the trigger signal that activates the first reference signal switching configuration according to the first periodicity for the first reference signal resource set and, upon expiration of the first periodicity, activates the second reference signal switching configuration according to the second periodicity for the second reference signal resource set.

The single SRS resource set configuration manager 1230 may transmit the configuration signal that indicates a single reference signal resource set, the single reference signal resource set including at least the first subset of reference signal resources associated with the first reference signal switching configuration and the second subset of reference signal resources associated with the second reference signal switching configuration. In some examples, the single SRS resource set configuration manager 1230 may transmit the configuration signal that indicates a first group identifier associated with the first subset of reference signal resources and a second group identifier associated with the second subset of reference signal resources, where the trigger signal activates the first subset of reference signal resources or the second subset of reference signal resources.

In some examples, the single SRS resource set configuration manager 1230 may transmit the configuration signal that indicates a first periodicity for the first subset of reference signal resources and a second periodicity for the second subset of reference signal resources. In some examples, the single SRS resource set configuration manager 1230 may transmit the trigger signal that activates the first reference signal switching configuration according to the first periodicity for the first subset of reference signal resources and the second reference signal switching configuration according to the second periodicity for the second subset of reference signal resources.

In some examples, the single SRS resource set configuration manager 1230 may transmit the trigger signal that activates the first reference signal switching configuration according to the first periodicity for the first subset of reference signal resources and, upon expiration of the first periodicity, activates the second reference signal switching configuration according to the second periodicity for the second subset of reference signal resources. In some examples, the single SRS resource set configuration manager 1230 may transmit the configuration signal that indicates a first slot-level periodicity associated with the first subset of reference signal resources and a second slot-level periodicity associated with the second subset of reference signal resources that differs from the first slot-level periodicity.

The group identification trigger manager 1235 may transmit the trigger signal that includes a group identifier that indicates one of the first reference signal switching configuration or the second reference signal switching configuration, where the reference signals are transmitted in accordance with the first reference signal switching configuration or the second reference signal switching configuration corresponding to the group identifier.

The trigger state trigger manager 1240 may transmit the trigger signal that includes a trigger state indication that indicates one of the first reference signal switching configuration or the second reference signal switching configuration, where the reference signals are aperiodic reference signals that are transmitted in accordance with the first reference signal switching configuration or the second reference signal switching configuration corresponding to the trigger state indication.

The UE capability manager 1245 may receive a UE capability message indicating support for multiple reference signal switching configurations for a BWP, where the configuration signal is transmitted based on the UE capability message.

In some examples, the UE capability manager 1245 may receive a UE capability message indicating an antenna switching capability of the UE, where the configuration signal is transmitted based on the antenna switching capability.

In some examples, the UE capability manager 1245 may receive a UE capability message indicating support for multiple active reference signal switching configurations for a BWP, the multiple active reference signal switching configurations comprising active reference signal switching configurations associated with different timing configurations, wherein the configuration signal is based at least in part on the UE capability message.

Figure 13:
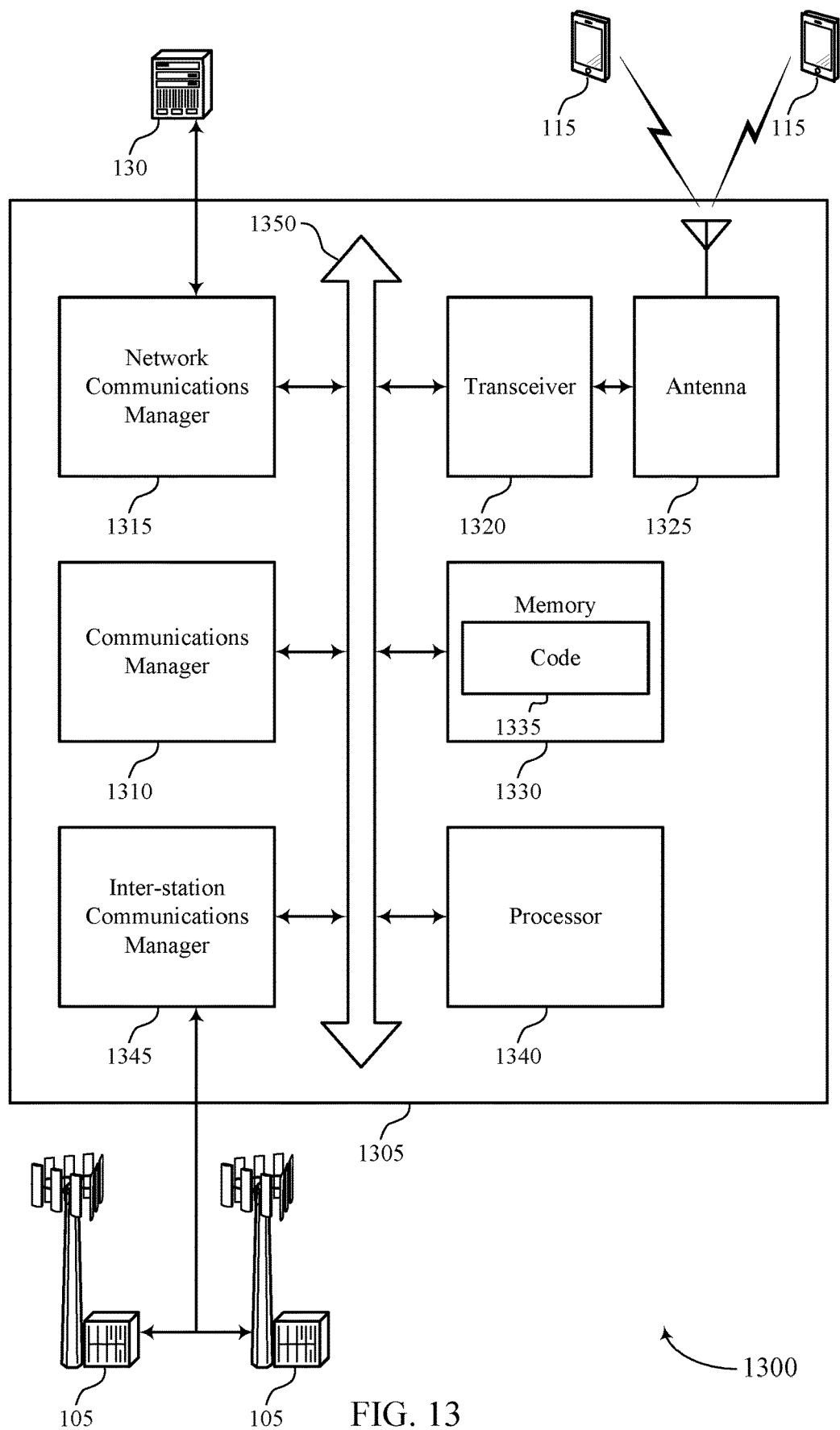
FIG. 13 shows a diagram of a system including a device in accordance with aspects of the present disclosure.

FIG. 13 shows a diagram of a system 1300 including a device 1305 that supports flexible SRS switching capability in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, to a UE, a configuration signal indicating one or more reference signal resource sets, the one or more reference signal resource sets including at least a first subset of reference signal resources associated with a first reference signal switching configuration and a second subset of reference signal resources associated with a second reference signal switching configuration, transmit a trigger signal activating at least the first reference signal switching configuration or the second reference signal switching configuration, and receive, based on the trigger signal, reference signals according to the first subset of reference signal resources or second subset of reference signal resources.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting support of flexible SRS switching capability).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
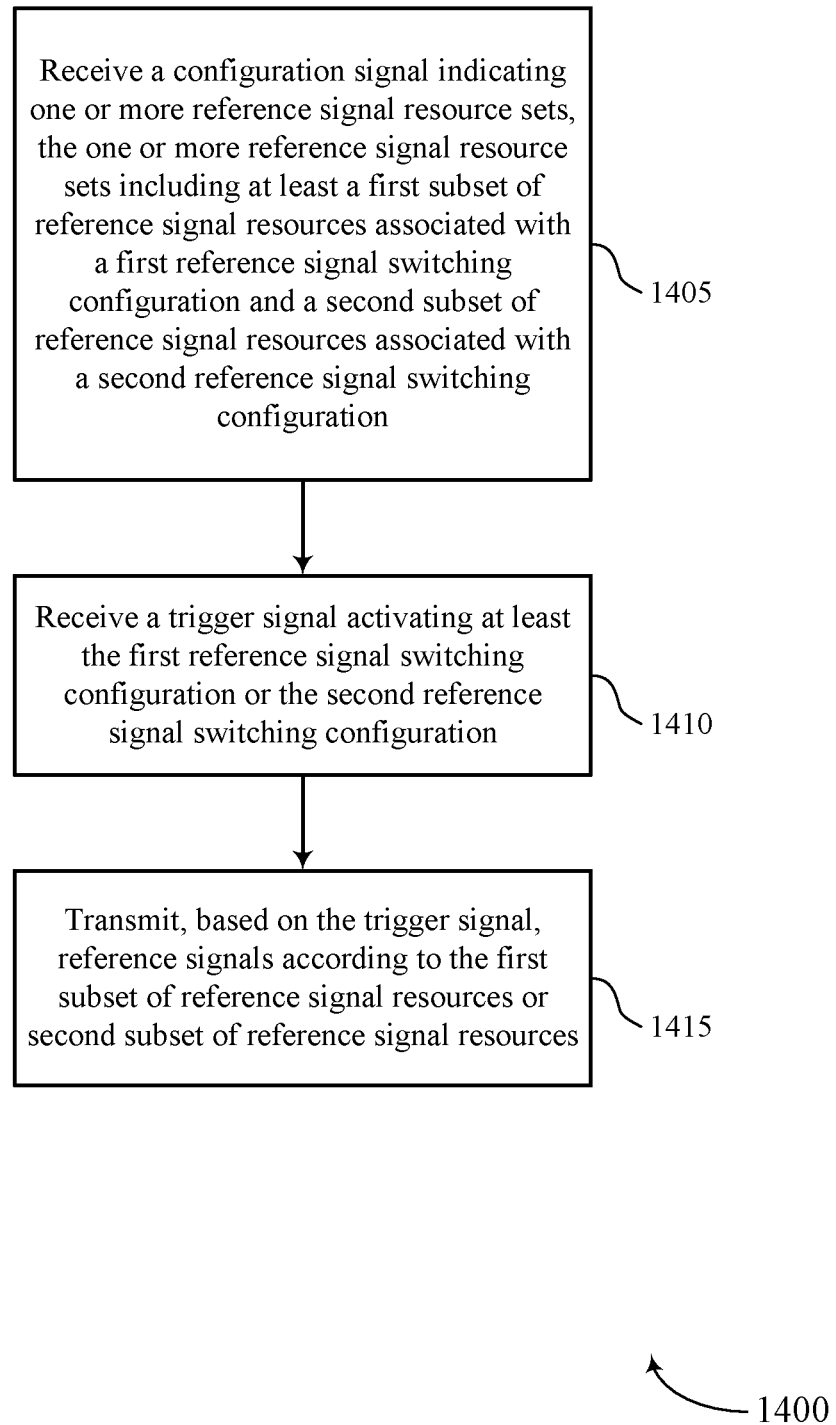
FIGS. 14 through 18 show flowcharts illustrating methods in accordance with aspects of the present disclosure.

FIG. 14 shows a flowchart illustrating a method 1400 that supports flexible SRS switching capability in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive a configuration signal indicating one or more reference signal resource sets, the one or more reference signal resource sets including at least a first subset of reference signal resources associated with a first reference signal switching configuration and a second subset of reference signal resources associated with a second reference signal switching configuration. The operations of 1405 may be performed according to the methods described herein. In some examples, aspects of the operations of 1405 may be performed by a configuration manager as described with reference to FIGS. 6 through 9.

At 1410, the UE may receive a trigger signal activating at least the first reference signal switching configuration or the second reference signal switching configuration. The operations of 1410 may be performed according to the methods described herein. In some examples, aspects of the operations of 1410 may be performed by a trigger manager as described with reference to FIGS. 6 through 9.

At 1415, the UE may transmit, based on the trigger signal, reference signals according to the first subset of reference signal resources or second subset of reference signal resources. The operations of 1415 may be performed according to the methods described herein. In some examples, aspects of the operations of 1415 may be performed by a SRS manager as described with reference to FIGS. 6 through 9.

Figure 15:
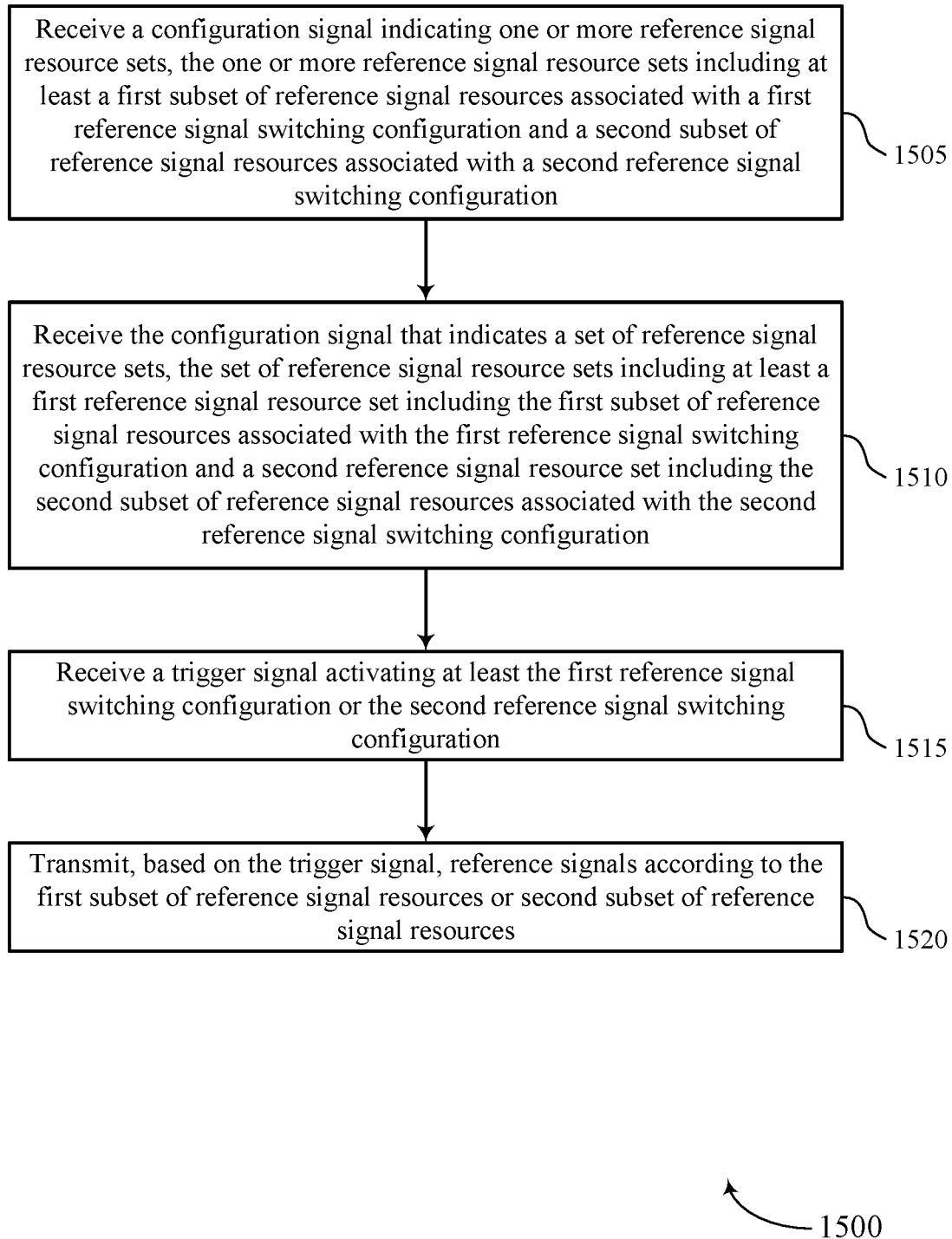

FIG. 15 shows a flowchart illustrating a method 1500 that supports flexible SRS switching capability in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive a configuration signal indicating one or more reference signal resource sets, the one or more reference signal resource sets including at least a first subset of reference signal resources associated with a first reference signal switching configuration and a second subset of reference signal resources associated with a second reference signal switching configuration. The operations of 1505 may be performed according to the methods described herein. In some examples, aspects of the operations of 1505 may be performed by a configuration manager as described with reference to FIGS. 6 through 9.

At 1510, the UE may receive the configuration signal that indicates a set of reference signal resource sets, the set of reference signal resource sets including at least a first reference signal resource set including the first subset of reference signal resources associated with the first reference signal switching configuration and a second reference signal resource set including the second subset of reference signal resources associated with the second reference signal switching configuration. The operations of 1510 may be performed according to the methods described herein. In some examples, aspects of the operations of 1510 may be performed by a multi-SRS resource set configuration manager as described with reference to FIGS. 6 through 9.

At 1515, the UE may receive a trigger signal activating at least the first reference signal switching configuration or the second reference signal switching configuration. The operations of 1515 may be performed according to the methods described herein. In some examples, aspects of the operations of 1515 may be performed by a trigger manager as described with reference to FIGS. 6 through 9.

At 1520, the UE may transmit, based on the trigger signal, reference signals according to the first subset of reference signal resources or second subset of reference signal resources. The operations of 1520 may be performed according to the methods described herein. In some examples, aspects of the operations of 1520 may be performed by a SRS manager as described with reference to FIGS. 6 through 9.

Figure 16:
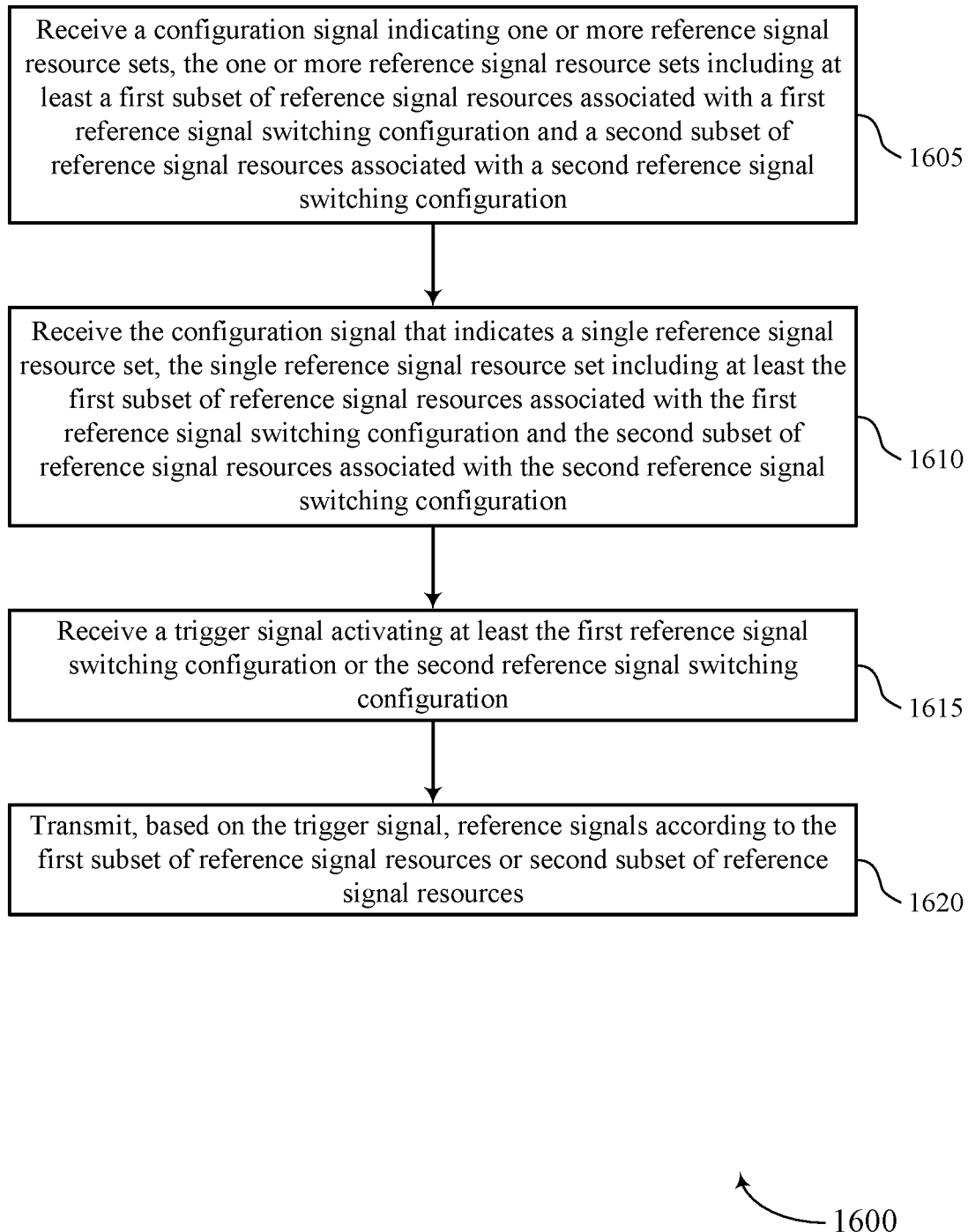

FIG. 16 shows a flowchart illustrating a method 1600 that supports flexible SRS switching capability in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive a configuration signal indicating one or more reference signal resource sets, the one or more reference signal resource sets including at least a first subset of reference signal resources associated with a first reference signal switching configuration and a second subset of reference signal resources associated with a second reference signal switching configuration. The operations of 1605 may be performed according to the methods described herein. In some examples, aspects of the operations of 1605 may be performed by a configuration manager as described with reference to FIGS. 6 through 9.

At 1610, the UE may receive the configuration signal that indicates a single reference signal resource set, the single reference signal resource set including at least the first subset of reference signal resources associated with the first reference signal switching configuration and the second subset of reference signal resources associated with the second reference signal switching configuration. The operations of 1610 may be performed according to the methods described herein. In some examples, aspects of the operations of 1610 may be performed by a single SRS resource set configuration manager as described with reference to FIGS. 6 through 9.

At 1615, the UE may receive a trigger signal activating at least the first reference signal switching configuration or the second reference signal switching configuration. The operations of 1615 may be performed according to the methods described herein. In some examples, aspects of the operations of 1615 may be performed by a trigger manager as described with reference to FIGS. 6 through 9.

At 1620, the UE may transmit, based on the trigger signal, reference signals according to the first subset of reference signal resources or second subset of reference signal resources. The operations of 1620 may be performed according to the methods described herein. In some examples, aspects of the operations of 1620 may be performed by a SRS manager as described with reference to FIGS. 6 through 9.

Figure 17:
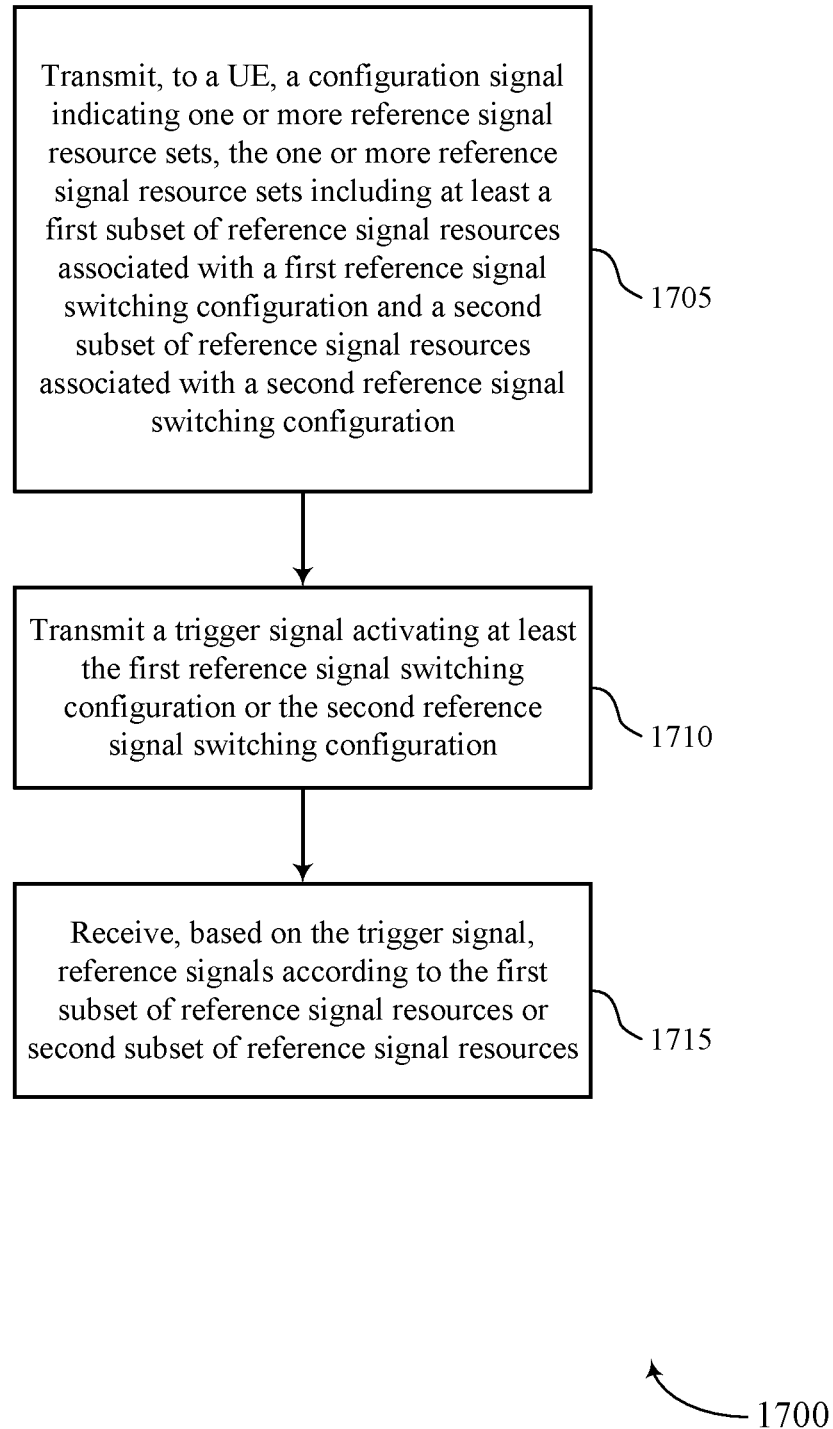

FIG. 17 shows a flowchart illustrating a method 1700 that supports flexible SRS switching capability in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may transmit, to a UE, a configuration signal indicating one or more reference signal resource sets, the one or more reference signal resource sets including at least a first subset of reference signal resources associated with a first reference signal switching configuration and a second subset of reference signal resources associated with a second reference signal switching configuration. The operations of 1705 may be performed according to the methods described herein. In some examples, aspects of the operations of 1705 may be performed by a configuration manager as described with reference to FIGS. 10 through 13.

At 1710, the base station may transmit a trigger signal activating at least the first reference signal switching configuration or the second reference signal switching configuration. The operations of 1710 may be performed according to the methods described herein. In some examples, aspects of the operations of 1710 may be performed by a trigger manager as described with reference to FIGS. 10 through 13.

At 1715, the base station may receive, based on the trigger signal, reference signals according to the first subset of reference signal resources or second subset of reference signal resources. The operations of 1715 may be performed according to the methods described herein. In some examples, aspects of the operations of 1715 may be performed by a SRS manager as described with reference to FIGS. 10 through 13.

Figure 18:
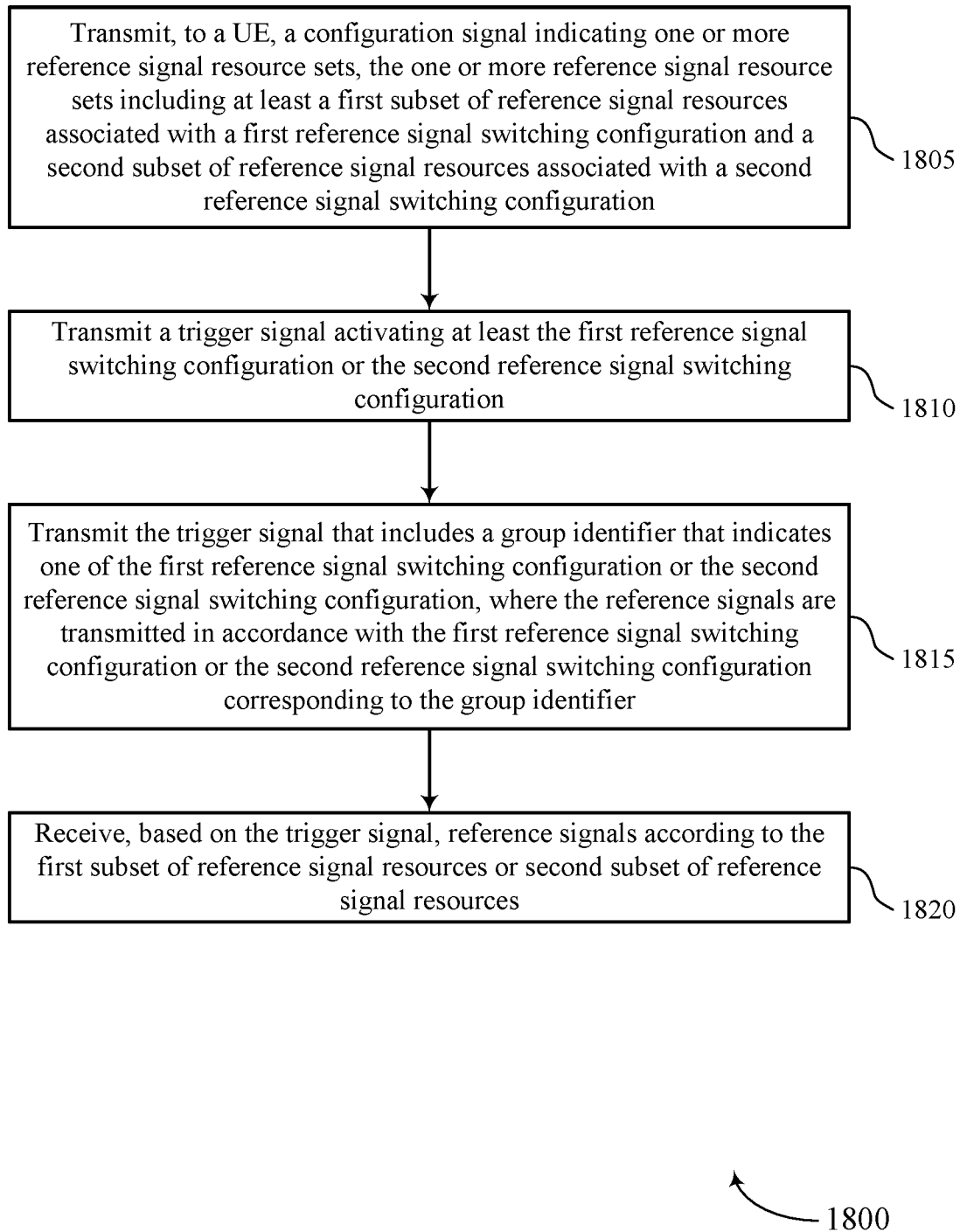

FIG. 18 shows a flowchart illustrating a method 1800 that supports flexible SRS switching capability in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may transmit, to a UE, a configuration signal indicating one or more reference signal resource sets, the one or more reference signal resource sets including at least a first subset of reference signal resources associated with a first reference signal switching configuration and a second subset of reference signal resources associated with a second reference signal switching configuration. The operations of 1805 may be performed according to the methods described herein. In some examples, aspects of the operations of 1805 may be performed by a configuration manager as described with reference to FIGS. 10 through 13.

At 1810, the base station may transmit a trigger signal activating at least the first reference signal switching configuration or the second reference signal switching configuration. The operations of 1810 may be performed according to the methods described herein. In some examples, aspects of the operations of 1810 may be performed by a trigger manager as described with reference to FIGS. 10 through 13.

At 1815, the base station may transmit the trigger signal that includes a group identifier that indicates one of the first reference signal switching configuration or the second reference signal switching configuration, where the reference signals are transmitted in accordance with the first reference signal switching configuration or the second reference signal switching configuration corresponding to the group identifier. The operations of 1815 may be performed according to the methods described herein. In some examples, aspects of the operations of 1815 may be performed by a group identification trigger manager as described with reference to FIGS. 10 through 13.

At 1820, the base station may receive, based on the trigger signal, reference signals according to the first subset of reference signal resources or second subset of reference signal resources. The operations of 1820 may be performed according to the methods described herein. In some examples, aspects of the operations of 1820 may be performed by a SRS manager as described with reference to FIGS. 10 through 13.

The following provides an overview of aspects of the present disclosure:

Aspect 1: A method for wireless communication at a UE, comprising: receiving a configuration signal indicating one or more reference signal resource sets, the one or more reference signal resource sets comprising at least a first subset of reference signal resources associated with a first reference signal switching configuration and a second subset of reference signal resources associated with a second reference signal switching configuration; receiving a trigger signal activating at least the first reference signal switching configuration or the second reference signal switching configuration; and transmitting, based at least in part on the trigger signal, reference signals according to the first subset of reference signal resources or second subset of reference signal resources.

Aspect 2: The method of aspect 1, wherein receiving the configuration signal comprises: receiving the configuration signal that indicates a plurality of reference signal resource sets, the plurality of reference signal resource sets comprising at least a first reference signal resource set comprising the first subset of reference signal resources associated with the first reference signal switching configuration and a second reference signal resource set comprising the second subset of reference signal resources associated with the second reference signal switching configuration.

Aspect 3: The method of aspect 2, wherein receiving the configuration signal comprises: receiving the configuration signal that indicates a first group identifier associated with the first reference signal resource set and a second group identifier associated with the second reference signal resource set.

Aspect 4: The method of any of aspects 2 through 3, wherein receiving the configuration signal comprises: receiving the configuration signal that indicates a first periodicity for the first reference signal resource set and a second periodicity for the second reference signal resource set.

Aspect 5: The method of aspect 4, wherein receiving the trigger signal comprises: receiving the trigger signal that activates the first reference signal switching configuration according to the first periodicity for the first reference signal resource set and the second reference signal switching configuration according to the second periodicity for the second reference signal resource set.

Aspect 6: The method of any of aspects 4 through 5, wherein receiving the trigger signal comprises: receiving the trigger signal that activates the first reference signal switching configuration according to the first periodicity for the first reference signal resource set and, upon expiration of the first periodicity, activates the second reference signal switching configuration according to the second periodicity for the second reference signal resource set.

Aspect 7: The method of any of aspects 1 through 6, wherein receiving the configuration signal comprises: receiving the configuration signal that indicates a single reference signal resource set, the single reference signal resource set comprising at least the first subset of reference signal resources associated with the first reference signal switching configuration and the second subset of reference signal resources associated with the second reference signal switching configuration.

Aspect 8: The method of aspect 7, wherein receiving the configuration signal comprises: receiving the configuration signal that indicates a first group identifier associated with the first subset of reference signal resources and a second group identifier associated with the second subset of reference signal resources, wherein the trigger signal activates the first subset of reference signal resources or the second subset of reference signal resources.

Aspect 9: The method of any of aspects 7 through 8, wherein receiving the configuration signal comprises: receiving the configuration signal that indicates a first periodicity for the first subset of reference signal resources and a second periodicity for the second subset of reference signal resources.

Aspect 10: The method of aspect 9, wherein receiving the trigger signal comprises: receiving the trigger signal that activates the first reference signal switching configuration according to the first periodicity for the first subset of reference signal resources and the second reference signal switching configuration according to the second periodicity for the second subset of reference signal resources.

Aspect 11: The method of any of aspects 9 through 10, wherein receiving the trigger signal comprises: receiving the trigger signal that activates the first reference signal switching configuration according to the first periodicity for the first subset of reference signal resources and, upon expiration of the first periodicity, activates the second reference signal switching configuration according to the second periodicity for the second subset of reference signal resources.

Aspect 12: The method of any of aspects 7 through 11, wherein receiving the configuration signal comprises: receiving the configuration signal that indicates a first slot-level periodicity associated with the first subset of reference signal resources and a second slot-level periodicity associated with the second subset of reference signal resources that differs from the first slot-level periodicity.

Aspect 13: The method of any of aspects 1 through 12, wherein receiving the trigger signal comprises: receiving the trigger signal that includes a group identifier that indicates one of the first reference signal switching configuration or the second reference signal switching configuration, wherein the reference signals are transmitted in accordance with the first reference signal switching configuration or the second reference signal switching configuration corresponding to the group identifier.

Aspect 14: The method of any of aspects 1 through 13, wherein receiving the trigger signal comprises: receiving the trigger signal that includes a trigger state indication that indicates one of the first reference signal switching configuration or the second reference signal switching configuration, wherein the reference signals are aperiodic reference signals that are transmitted in accordance with the first reference signal switching configuration or the second reference signal switching configuration corresponding to the trigger state indication.

Aspect 15: The method of any of aspects 1 through 14, wherein the trigger signal comprises a DCI or a medium access control (MAC) control element (CE).

Aspect 16: The method of any of aspects 1 through 15, further comprising: transmitting a UE capability message indicating support for multiple reference signal switching configurations for a bandwidth part (BWP), wherein the configuration signal is based at least in part on the UE capability message.

Aspect 17: The method of any of aspects 1 through 16, further comprising: transmitting a UE capability message indicating an antenna switching capability of the UE, wherein the configuration signal is based at least in part on the antenna switching capability.

Aspect 18: The method of any of aspects 1 through 17, further comprising: transmitting a UE capability message indicating support for multiple active reference signal switching configurations for a bandwidth part (BWP), the multiple active reference signal switching configurations comprising active reference signal switching configurations associated with different timing configurations, wherein the configuration signal is based at least in part on the UE capability message.

Aspect 19: The method of any of aspects 1 through 18, wherein transmitting the reference signals comprises: transmitting a first one or more reference signals using a first antenna configuration; and transmitting a second one or more reference signals using a second antenna configuration different from the first antenna configuration.

Aspect 20: A method for wireless communication at a base station, comprising: transmitting, to a UE, a configuration signal indicating one or more reference signal resource sets, the one or more reference signal resource sets comprising at least a first subset of reference signal resources associated with a first reference signal switching configuration and a second subset of reference signal resources associated with a second reference signal switching configuration; transmitting a trigger signal activating at least the first reference signal switching configuration or the second reference signal switching configuration; and receiving, based at least in part on the trigger signal, reference signals according to the first subset of reference signal resources or second subset of reference signal resources.

Aspect 21: The method of aspect 20, wherein transmitting the configuration signal comprises: transmitting the configuration signal that indicates a plurality of reference signal resource sets, the plurality of reference signal resource sets comprising at least a first reference signal resource set comprising the first subset of reference signal resources associated with the first reference signal switching configuration and a second reference signal resource set comprising the second subset of reference signal resources associated with the second reference signal switching configuration.

Aspect 22: The method of aspect 21, wherein transmitting the configuration signal comprises: transmitting the configuration signal that indicates a first group identifier associated with the first reference signal resource set and a second group identifier associated with the second reference signal resource set.

Aspect 23: The method of any of aspects 21 through 22, wherein transmitting the configuration signal comprises: transmitting the configuration signal that indicates a first periodicity for the first reference signal resource set and a second periodicity for the second reference signal resource set.

Aspect 24: The method of aspect 23, wherein transmitting the trigger signal comprises: transmitting the trigger signal that activates the first reference signal switching configuration according to the first periodicity for the first reference signal resource set and the second reference signal switching configuration according to the second periodicity for the second reference signal resource set.

Aspect 25: The method of any of aspects 23 through 24, wherein transmitting the trigger signal comprises: transmitting the trigger signal that activates the first reference signal switching configuration according to the first periodicity for the first reference signal resource set and, upon expiration of the first periodicity, activates the second reference signal switching configuration according to the second periodicity for the second reference signal resource set.

Aspect 26: The method of any of aspects 20 through 25, wherein transmitting the configuration signal comprises: transmitting the configuration signal that indicates a single reference signal resource set, the single reference signal resource set comprising at least the first subset of reference signal resources associated with the first reference signal switching configuration and the second subset of reference signal resources associated with the second reference signal switching configuration.

Aspect 27: The method of aspect 26, wherein transmitting the configuration signal comprises: transmitting the configuration signal that indicates a first group identifier associated with the first subset of reference signal resources and a second group identifier associated with the second subset of reference signal resources, wherein the trigger signal activates the first subset of reference signal resources or the second subset of reference signal resources.

Aspect 28: The method of any of aspects 26 through 27, wherein transmitting the configuration signal comprises: transmitting the configuration signal that indicates a first periodicity for the first subset of reference signal resources and a second periodicity for the second subset of reference signal resources.

Aspect 29: The method of aspect 28, wherein transmitting the trigger signal comprises: transmitting the trigger signal that activates the first reference signal switching configuration according to the first periodicity for the first subset of reference signal resources and the second reference signal switching configuration according to the second periodicity for the second subset of reference signal resources.

Aspect 30: The method of any of aspects 28 through 29, wherein transmitting the trigger signal comprises: transmitting the trigger signal that activates the first reference signal switching configuration according to the first periodicity for the first subset of reference signal resources and, upon expiration of the first periodicity, activates the second reference signal switching configuration according to the second periodicity for the second subset of reference signal resources.

Aspect 31: The method of any of aspects 28 through 30, wherein transmitting the configuration signal comprises: transmitting the configuration signal that indicates a first slot-level periodicity associated with the first subset of reference signal resources and a second slot-level periodicity associated with the second subset of reference signal resources that differs from the first slot-level periodicity.

Aspect 32: The method of any of aspects 20 through 31, wherein transmitting the trigger signal comprises: transmitting the trigger signal that includes a group identifier that indicates one of the first reference signal switching configuration or the second reference signal switching configuration, wherein the reference signals are transmitted in accordance with the first reference signal switching configuration or the second reference signal switching configuration corresponding to the group identifier.

Aspect 33: The method of any of aspects 20 through 32, wherein transmitting the trigger signal comprises: transmitting the trigger signal that includes a trigger state indication that indicates one of the first reference signal switching configuration or the second reference signal switching configuration, wherein the reference signals are aperiodic reference signals that are transmitted in accordance with the first reference signal switching configuration or the second reference signal switching configuration corresponding to the trigger state indication.

Aspect 34: The method of any of aspects 20 through 33, wherein the trigger signal comprises a DCI or a medium access control (MAC) control element (CE).

Aspect 35: The method of any of aspects 20 through 34, further comprising: receiving a UE capability message indicating support for multiple reference signal switching configurations for a bandwidth part (BWP), wherein the configuration signal is transmitted based at least in part on the UE capability message.

Aspect 36: The method of any of aspects 20 through 35, further comprising: receiving a UE capability message indicating an antenna switching capability of the UE, wherein the configuration signal is transmitted based at least in part on the antenna switching capability.

Aspect 37: The method of any of aspects 20 through 36, further comprising: receiving a UE capability message indicating support for multiple active reference signal switching configurations for a bandwidth part (BWP), the multiple active reference signal switching configurations comprising active reference signal switching configurations associated with different timing configurations, wherein the configuration signal is based at least in part on the UE capability message.

Aspect 38: The method of any of aspects 20 through 37, wherein receiving the reference signals comprises: receiving a first one or more reference signals using a first antenna configuration; and receiving a second one or more reference signals using a second antenna configuration different from the first antenna configuration.

Aspect 39: An apparatus for wireless communication at a UE, comprising a processor; memory coupled with the processor; and instructions stored in the memory and executable by the processor to cause the apparatus to perform a method of any of aspects 1 through 19.

Aspect 40: An apparatus for wireless communication at a UE, comprising at least one means for performing a method of any of aspects 1 through 19.

Aspect 41: A non-transitory computer-readable medium storing code for wireless communication at a UE, the code comprising instructions executable by a processor to perform a method of any of aspects 1 through 19.

Aspect 42: An apparatus for wireless communication at a base station, comprising a processor; memory coupled with the processor; and instructions stored in the memory and executable by the processor to cause the apparatus to perform a method of any of aspects 20 through 38.

Aspect 43: An apparatus for wireless communication at a base station, comprising at least one means for performing a method of any of aspects 20 through 38.

Aspect 44: A non-transitory computer-readable medium storing code for wireless communication at a base station, the code comprising instructions executable by a processor to perform a method of any of aspects 20 through 38.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:

receiving a configuration signal indicating one or more reference signal resource sets, the one or more reference signal resource sets comprising at least a first subset of reference signal resources associated with a first reference signal switching configuration and a second subset of reference signal resources associated with a second reference signal switching configuration, wherein receiving the configuration signal comprises:
receiving the configuration signal that indicates a plurality of reference signal resource sets, the plurality of reference signal resource sets comprising at least a first reference signal resource set comprising the first subset of reference signal resources associated with the first reference signal switching configuration and a second reference signal resource set comprising the second subset of reference signal resources associated with the second reference signal switching configuration, wherein the configuration signal indicates a first periodicity for the first reference signal resource set and a second periodicity for the second reference signal resource set;

receiving a trigger signal activating the first reference signal switching configuration and the second reference signal switching configuration, wherein receiving the trigger signal comprises:
receiving the trigger signal that activates the first reference signal switching configuration according to the first periodicity for the first reference signal resource set and the second reference signal switching configuration according to the second periodicity for the second reference signal resource set; and transmitting, based at least in part on the trigger signal, reference signals according to the first subset of reference signal resources or the second subset of reference signal resources.

2. The method of claim 1, wherein receiving the configuration signal comprises:
receiving the configuration signal that indicates a first group identifier associated with the first reference signal resource set and a second group identifier associated with the second reference signal resource set.

3. The method of claim 1, wherein receiving the trigger signal comprises:
receiving the trigger signal that activates the first reference signal switching configuration according to the first periodicity for the first reference signal resource set and, upon expiration of the first periodicity, activates the second reference signal switching configuration according to the second periodicity for the second reference signal resource set.

4. The method of claim 1, wherein receiving the configuration signal comprises:
receiving the configuration signal that indicates a single reference signal resource set, the single reference signal resource set comprising at least the first subset of reference signal resources associated with the first reference signal switching configuration and the second subset of reference signal resources associated with the second reference signal switching configuration.

5. The method of claim 4, wherein receiving the configuration signal comprises:
receiving the configuration signal that indicates a first group identifier associated with the first subset of reference signal resources and a second group identifier associated with the second subset of reference signal resources, wherein the trigger signal activates the first subset of reference signal resources or the second subset of reference signal resources.

6. The method of claim 4, wherein receiving the configuration signal comprises:
receiving the configuration signal that indicates the first periodicity for the first subset of reference signal resources and the second periodicity for the second subset of reference signal resources.

7. The method of claim 6, wherein receiving the trigger signal comprises:
receiving the trigger signal that activates the first reference signal switching configuration according to the first periodicity for the first subset of reference signal resources and the second reference signal switching configuration according to the second periodicity for the second subset of reference signal resources.

8. The method of claim 6, wherein receiving the trigger signal comprises:
receiving the trigger signal that activates the first reference signal switching configuration according to the first periodicity for the first subset of reference signal resources and, upon expiration of the first periodicity, activates the second reference signal switching configuration according to the second periodicity for the second subset of reference signal resources.

9. The method of claim 4, wherein receiving the configuration signal comprises:
receiving the configuration signal that indicates a first slot-level periodicity associated with the first subset of reference signal resources and a second slot-level periodicity associated with the second subset of reference signal resources that differs from the first slot-level periodicity.

10. The method of claim 1, wherein receiving the trigger signal comprises:
receiving the trigger signal that includes a group identifier that indicates one of the first reference signal switching configuration or the second reference signal switching configuration, wherein the reference signals are transmitted in accordance with the first reference signal switching configuration or the second reference signal switching configuration corresponding to the group identifier.

11. The method of claim 1, wherein receiving the trigger signal comprises:
receiving the trigger signal that includes a trigger state indication that indicates one of the first reference signal switching configuration or the second reference signal switching configuration, wherein the reference signals are aperiodic reference signals that are transmitted in accordance with the first reference signal switching configuration or the second reference signal switching configuration corresponding to the trigger state indication.

12. The method of claim 1, wherein the trigger signal comprises a downlink control information (DCI) or a medium access control (MAC) control element (CE).

13. The method of claim 1, further comprising:
transmitting a UE capability message indicating support for multiple reference signal switching configurations for a bandwidth part (BWP), wherein the configuration signal is based at least in part on the UE capability message.

14. The method of claim 1, further comprising:
transmitting a UE capability message indicating an antenna switching capability of the UE, wherein the configuration signal is based at least in part on the antenna switching capability.

15. The method of claim 1, further comprising:
transmitting a UE capability message indicating support for multiple active reference signal switching configurations for a bandwidth part (BWP), the multiple active reference signal switching configurations comprising active reference signal switching configurations associated with different timing configurations, wherein the configuration signal is based at least in part on the UE capability message.

16. The method of claim 1, wherein transmitting the reference signals comprises:
transmitting a first one or more reference signals using a first antenna configuration; and
transmitting a second one or more reference signals using a second antenna configuration different from the first antenna configuration.

17. A method for wireless communication at a base station, comprising:
transmitting, to a user equipment (UE), a configuration signal indicating one or more reference signal resource sets, the one or more reference signal resource sets comprising at least a first subset of reference signal resources associated with a first reference signal switching configuration and a second subset of reference signal resources associated with a second reference signal switching configuration, wherein transmitting the configuration signal comprises:
transmitting the configuration signal that indicates a plurality of reference signal resource sets, the plurality of reference signal resource sets comprising at least a first reference signal resource set comprising the first subset of reference signal resources associated with the first reference signal switching configuration and a second reference signal resource set comprising the second subset of reference signal resources associated with the second reference signal switching configuration, wherein the configuration signal indicates a first periodicity for the first reference signal resource set and a second periodicity for the second reference signal resource set;

transmitting a trigger signal activating at least the first reference signal switching configuration or the second reference signal switching configuration, wherein receiving the trigger signal comprises:

transmitting the trigger signal that activates the first reference signal switching configuration according to the first periodicity for the first reference signal resource set and the second reference signal switching configuration according to the second periodicity for the second reference signal resource set; and receiving, based at least in part on the trigger signal, reference signals according to the first subset of reference signal resources or the second subset of reference signal resources.

18. An apparatus for wireless communication at a user equipment (UE), comprising:

a processor, memory coupled with the processor; and instructions stored in the memory and executable by the processor to cause the apparatus to:

receive a configuration signal indicating one or more reference signal resource sets, the one or more reference signal resource sets comprising at least a first subset of reference signal resources associated with a first reference signal switching configuration and a second subset of reference signal resources associated with a second reference signal switching configuration, wherein the instructions to receive the configuration signal are executable by the processor to cause the apparatus to:

receive the configuration signal that indicates a plurality of reference signal resource sets, the plurality of reference signal resource sets comprising at least a first reference signal resource set comprising the first subset of reference signal resources associated with the first reference signal switching configuration and a second reference signal resource set comprising the second subset of reference signal resources associated with the second reference signal switching configuration, wherein the configuration signal indicates a first periodicity for the first reference signal resource set and a second periodicity for the second reference signal resource set;

receive a trigger signal activating at least the first reference signal switching configuration or the second reference signal switching configuration wherein the instructions to receive the trigger signal are executable by the processor to cause the apparatus to:

receive the trigger signal that activates the first reference signal switching configuration according to the first periodicity for the first reference signal resource set and the second reference signal switching configuration according to the second periodicity for the second reference signal resource set; and transmit, based at least in part on the trigger signal, reference signals according to the first subset of reference signal resources or the second subset of reference signal resources.

19. The apparatus of claim 18, wherein the instructions to receive the configuration signal are executable by the processor to cause the apparatus to:

receive the configuration signal that indicates a first group identifier associated with the first reference signal resource set and a second group identifier associated with the second reference signal resource set.

20. The apparatus of claim 18, wherein the instructions to receive the trigger signal are executable by the processor to cause the apparatus to:

receive the trigger signal that activates the first reference signal switching configuration according to the first periodicity for the first reference signal resource set and, upon expiration of the first periodicity, activates the second reference signal switching configuration according to the second periodicity for the second reference signal resource set.

21. The apparatus of claim 18, wherein the instructions to receive the configuration signal are executable by the processor to cause the apparatus to:

receive the configuration signal that indicates a single reference signal resource set, the single reference signal resource set comprising at least the first subset of reference signal resources associated with the first reference signal switching configuration and the second subset of reference signal resources associated with the second reference signal switching configuration.

22. The apparatus of claim 21, wherein the instructions to receive the configuration signal are executable by the processor to cause the apparatus to:

receive the configuration signal that indicates a first group identifier associated with the first subset of reference signal resources and a second group identifier associated with the second subset of reference signal resources, wherein the trigger signal activates the first subset of reference signal resources or the second subset of reference signal resources.

23. The apparatus of claim 21, wherein the instructions to receive the configuration signal are executable by the processor to cause the apparatus to:

receive the configuration signal that indicates the first periodicity for the first subset of reference signal resources and the second periodicity for the second subset of reference signal resources.

24. An apparatus for wireless communication at a base station, comprising:

a processor, memory coupled with the processor; and instructions stored in the memory and executable by the processor to cause the apparatus to:

transmit, to a user equipment (UE), a configuration signal indicating one or more reference signal resource sets, the one or more reference signal resource sets comprising at least a first subset of reference signal resources associated with a first reference signal switching configuration and a second subset of reference signal resources associated with a second reference signal switching configuration, wherein the instructions to transmit the configuration signal are executable by the processor to cause the apparatus to:

transmit the configuration signal that indicates a plurality of reference signal resource sets, the plurality of reference signal resource sets comprising at least a first reference signal resource set comprising the first subset of reference signal resources associated with the first reference signal switching configuration and a second reference signal resource set comprising the second subset of reference signal resources associated with the second reference signal switching configuration, wherein the configuration signal indicates a first periodicity for the first reference signal resource set and a second periodicity for the second reference signal resource set;

transmit a trigger signal activating at least the first reference signal switching configuration or the second reference signal switching configuration, wherein the instructions to transmit the trigger signal are executable by the processor to cause the apparatus to:

transmit the trigger signal that activates the first reference signal switching configuration according to the first periodicity for the first reference signal resource set and the second reference signal switching configuration according to the second periodicity for the second reference signal resource set; and receive, based at least in part on the trigger signal, reference signals according to the first subset of reference signal resources or the second subset of reference signal resources.

25. The apparatus of claim 24, wherein the instructions to transmit the configuration signal are executable by the processor to cause the apparatus to:

transmit the configuration signal that indicates a first group identifier associated with the first reference signal resource set and a second group identifier associated with the second reference signal resource set.

26. The apparatus of claim 24, wherein the instructions to transmit the trigger signal are executable by the processor to cause the apparatus to:

transmit the trigger signal that activates the first reference signal switching configuration according to the first periodicity for the first reference signal resource set and, upon expiration of the first periodicity, activates the second reference signal switching configuration according to the second periodicity for the second reference signal resource set.

27. The apparatus of claim 24, wherein the instructions to transmit the configuration signal are executable by the processor to cause the apparatus to:

transmit the configuration signal that indicates a single reference signal resource set, the single reference signal resource set comprising at least the first subset of reference signal resources associated with the first reference signal switching configuration and the second subset of reference signal resources associated with the second reference signal switching configuration.

28. The method of claim 17, wherein transmitting the configuration signal comprises:

transmitting the configuration signal that indicates a first group identifier associated with the first reference signal resource set and a second group identifier associated with the second reference signal resource set.

29. The method of claim 17, wherein transmitting the trigger signal comprises:

transmitting the trigger signal that activates the first reference signal switching configuration according to the first periodicity for the first reference signal resource set and, upon expiration of the first periodicity, activates the second reference signal switching configuration according to the second periodicity for the second reference signal resource set.

30. The method of claim 1, wherein transmitting the configuration signal comprises:

transmitting the configuration signal that indicates a single reference signal resource set, the single reference signal resource set comprising at least the first subset of reference signal resources associated with the first reference signal switching configuration and the second subset of reference signal resources associated with the second reference signal switching configuration.

* * * * *